United States Patent [19]

Bauermeister et al.

[11] Patent Number: 5,586,241
[45] Date of Patent: Dec. 17, 1996

[54] METHOD AND SYSTEM FOR CREATING, SPECIFYING, AND GENERATING PARAMETRIC FONTS

[75] Inventors: Benjamin P. Bauermeister; Clyde D. McQueen, III; Michael S. DeLaurentis; Paul M. Higinbotham; Daniel E. Lipkie; Donald J. Munsil, all of Seattle; Raymond G. Beausoleil, Redmond, all of Wash.

[73] Assignee: Hewlett-Packard Company, Palo Alto, Calif.

[21] Appl. No.: 75,039

[22] Filed: Jun. 10, 1993

[51] Int. Cl.$^6$ .................................................. G06F 15/00
[52] U.S. Cl. .......................................... 395/167; 395/170
[58] Field of Search .................................. 395/110, 150, 395/151; 345/143, 194, 195

[56] References Cited

U.S. PATENT DOCUMENTS

| | | | |
|---|---|---|---|
| 4,675,830 | 6/1987 | Hawkins | 364/518 |
| 4,785,391 | 11/1988 | Apley et al. | 364/518 |
| 4,959,801 | 9/1990 | Apley et al. | 364/518 |
| 5,099,435 | 3/1992 | Collins et al. | 395/150 |
| 5,185,818 | 2/1993 | Warnock | 382/54 |
| 5,257,016 | 10/1993 | Fujii et al. | 345/143 |
| 5,280,577 | 1/1994 | Trevett et al. | 395/150 |
| 5,325,479 | 6/1994 | Kaasila | 395/151 |
| 5,345,548 | 9/1994 | Nomura et al. | 395/150 |
| 5,384,905 | 1/1995 | Tanaka et al. | 395/143 |
| 5,412,771 | 5/1993 | Fenwick | 395/150 |

OTHER PUBLICATIONS

"Post Script Language Reference Manual", Addison–Wesley Publishing Co. (1990), pp. 1–22, 143, 144, and 257–291.
Mendelson, "Typecasting", PC Magazine, vol. 11 No. 8 (Oct. 27, 1992), pp. 199–202, 204, 213, 214, 218, 222, 227, 228, 237, 239, 242, 244, 249, 250, 252, and 254.
B. Bauermeister, "A Manual of Comparative Typography–The PANOSE System," Van Nostrand Reinhold Company, Inc., 1988©, pp. vii–xxvii & Display pages.
Agfa Compugraphic Division, *Intellifont Scalable Typeface Format*, 1990/1991.
Microsoft Corporation, *TrueType 1.0 Font Files Technical Specification Revision 1.5 Jan. 1994*, 1990–1994.
D. E. Knuth, *The Metafont Book*, (Addison–Wesley, Reading, 1986), ISBN 0-201-13444-6.

*Primary Examiner*—Mark K. Zimmerman
*Assistant Examiner*—Stephen Hong
*Attorney, Agent, or Firm*—Ronald M. Anderson

[57] ABSTRACT

A method and system for parametrically generating characters and fonts. A font generation system is run on a computer and allows a user to create a Terafont binary file, which includes a set of universal font generation rules that are applied to generating fonts consistent with a common type of alphabet, and parametric data files, each of which specify a particular font. The user can create a new font, or replicate an existing font. The parametric data are distributed as files or embedded in documents. One or more characters of a font are generated using a font engine that executes the Terafont binary file on a computer using the parametric data specifying that font as an input. The parametric data provided to the font engine at least include a minimal set of font measurement data, such as a PANOSE™ number, which are used to compute global variables representing typographic characteristics common to many—if not all—of the glyphs in the font. Additional global and local variables needed to capture nuances of individual characters are computed or assigned default values by the font engine. Thus, a wide variety of fonts can be generated, each font using a set of parametric data relatively small in size, without extrapolating from a single master outline or interpolating between two or more outlines. Since the generated character outlines are defined in terms of conventional mathematical constructs, they are easily reformatted into other digital font formats by the font engine, if necessary.

54 Claims, 12 Drawing Sheets

```
TESTLTD: EC TIMES NEW ROMAN
FILE  EDIT  OPTIONS  VIEW  WINDOW  HELP

EC TIMES ROMAN                          FUNCTION 'UPPERE1'

FBOWLMIDTOPFACT = .46,         PRCOR3=26              ⊞ POINTSREFS
FOUTROUND = .49,               PRCOR4=27              ⊞ KS9_GET_METRICS
DTOPBOWL = 220;                PRRGHTBASELINE=28      ⊟ KS_1_CALC_VAN
                               ADMETS={42,1162,47}
                               DWID=768                  DESIGN DCAPTALL = $DCAPTAL
UPPERC1\1:                     DSTEMWIDE=188             DESIGN DMID = $DCAPTALL*9\10
  DBOTCUTWID = 34,             DSTEMMAR=62
  GBOTCUTPITCH = 167,          DSERWID=195               ANGLE GSLANT = 100 - $GVCS
  DTOPCUTX = 1168,             DCAPTALL=1372
  DTOPCUTY = 929,              DMID=713                  IF $PAN(0) < 6 THEN
  BOTSTEM = 91;                GSLANT=0G                    FRACTION FTOPSET = 9\10
UPPERD1\2:                     FTOPSET=0.98(98/100)      ELSE
  FOUTROUND = .48,             DMIDSET=629                  FTOPSET = 1\1;
  DBOTDIST = 328,              TALIGN={384,1509}         ENDIF
  JTOPFLEX = 1,                DCORRAD=0
  JBOTFLEX = 1;                DTOPSET=753               DESIGN DMIDSET = DWID * 0.
UPPERE1\9:                     FCORROUND=0.42(42/100)    POINT TALIGN = {DWID/2, $D}
  DWID = 768;                  GTOPANG=5G                KSLAM(1);
UPPERE1\1:                     GMIDANG=0G
  FTOPSET = .98,
  DMIDSET *= 82\65;
```

FIG. 12.

METHOD AND SYSTEM FOR CREATING, SPECIFYING, AND GENERATING PARAMETRIC FONTS

FIELD OF THE INVENTION

The present invention generally relates to the creation and generation of digital fonts, and in particular, to a method and system for parametrically generating any of a wide variety of digital typefaces based upon a data file that defines parameters of the typeface.

BACKGROUND OF THE INVENTION

Digital fonts have become ubiquitous in the age of the personal computer. While the increasing availability of different fonts have concomitantly increased the range of typographic expression available when preparing document on a computer, it has created a new class of problems. In particular, a document created on one computer system using digital fonts available on that system may not be readily displayed with high fidelity on another system (even if the type of computers and/or operating systems are identical), unless the same font files are available on the other system. While it is possible for the second operating system to map a font request made by, for example, a word processing application, into a request for a related, but different font, this replacement font will not in general be a close replica of the font used to create the document on the original computer system.

Digital electronic representations of fonts are typically stored on components of the hardware that comprises the computer system, such as on a hard disk, or in a read only memory (ROM) in a printer. Fonts are then "requested" by a document that has been opened by application software, for display by the computer system. If a requested font is available, the computer operating system accesses the digital data defining the font, converts the data into native graphical display objects, and then displays the appropriate characters. If the font is not available, the operating system may attempt to substitute another available typeface.

The font creation and distribution process can be described as a sequence of operations applied to an initial artistic representation or conception of a font. The first operation, which is typically performed in the "shop" using computer software, converts from an initial visual or pictorial representation of each character in a font, to a digital format suitable for distribution to the "field." In the field, a sequence of operations is performed to display the font on a computer system, either on a computer monitor, on the output of an electronic printer, or using any other output device capable of producing a bitmap (or other type) display of one or more characters of the font. This same process is normally used to create and supply typefaces to the field, regardless of the digital format in which the font is distributed.

The basic prior art digital formats used for distributing fonts are as follows:

Bitmapped Fonts

Fonts represented as bitmaps have typically been tuned for a particular system resolution. That is, each displayed character in the font consists of a certain number of black pixels that have been laid into a square grid. Consequently, different digital bitmap files must be created for different display sizes of a given typeface. Software is available that facilitates digitally defining the shapes of bitmapped fonts, making the task of producing or modifying such fonts somewhat easier. The most significant example of such software for bitmapped fonts is the METAFONT™ program, designed by D. E. Knuth. The METAFONT™ program includes procedural software used to construct digital representations of fonts, based on numerical input data. However, the instruction stream generated by compiling a METAFONT™ font description source file must be executed once for each different desired point size, since the output digital font format is bitmapped. Thus, a desired point size font cannot be generated in the field using a subset of all possible input parameters, since the capability to develop the appropriate font file exists only in the shop; the binary files distributed to the field (each of which actually contains the complete character definitions for a given point size bitmapped font) are in fact much larger than the original data files used to create them; and the range of fonts that can be constructed by arbitrary selection of input parameter values is necessarily quite limited.

Scalable Outline Fonts

Fonts represented by scalable outlines are generally stored as a collection of on-curve and/or off-curve points, which describe fundamental graphical constructs such as lines and circular arcs, or second-order and third-order Bezier curves. They can be displayed accurately at nearly any device resolution. However, at low resolutions, hinting programs are usually executed prior to rasterization to improve the perceived appearance of characters in the font. Scalable font files are considerably smaller than the collection of bitmapped font files that would be required to represent the same range of point sizes for a particular typeface. Nevertheless, since all points, hint programs, and metric data are stored in the data file, the file size required to provide high fidelity replication of the original font is typically 35–70 kBytes; hence 200 such fonts would require 7–14 MB of storage for font description data alone. Commercially available examples of digitally scalable outline font formats are PostScript™ Type 1 and TrueType™ 1 (which use Bezier curves to connect points), and INTELLIFONT™ (which uses lines and arcs).

Generally, outline fonts based on any of these scalable formats are generated in the shop that is producing the font and then distributed to the field. The operating systems of the computers on which these fonts are used can generate the required characters by directly converting the digitally formatted font files into graphical display objects, or by using utility software provided by the font vendor, which enables the operating system to perform the conversion.

Distortable Outline Fonts

Fonts represented by distortable outlines are generally stored as one or more scalable outline fonts with rules that specify either how to extrapolate from a particular outline font, or how to interpolate between two or more outline fonts. The extrapolations and/or interpolations occur along a limited number of well-defined axes or line segments. For example, suppose that two scalable typefaces, which differ only in "contrast," are defined as the end points of an interpolation operation. (The typographic term "contrast" is defined for purposes of this discussion, as the difference between the widths of the stems or strokes used for vertical and horizontal components of the characters in the font.) The lower contrast font is assigned the value 0.0 on the "contrast" axis, while the higher contrast font is assigned the value 1.0. The rules applied to the distortable font data specify the interpolation of the on-curve and off-curve point positions, as the "contrast" parameter is varied. These rules, the two outline fonts, any hint programs, and the subsystem that applies the rules to the available outlines can be used for generating a font. The metric data and the "contrast" value constitute a digital parameter file. In principle, any value of the contrast that can be found between the two endpoints of the interpolation axis can be used to create a new font. However, since the outlines that define the endpoints of the "contrast" interval must have the same number of points, distortion cannot occur between two fonts that contain fundamentally different topologies, preventing one font from being edited by adding such distortion, to synthesize the other font having a different topology. Furthermore, other typographic characteristics, such as "weight," cannot be altered by adjusting the "contrast" parameter; hence, an additional axis and two additional outline fonts must be added to define new interpolation endpoints. This fact has very significant consequences relating to the size of the data file required to define a conventional distortable font.

In general, if n typographic characteristics are to be represented by a distortable font, then $2^n$ outline fonts are required to define the endpoints of the necessary distortion axes, and an identical number of input parameters must be specified to produce the output font. Clearly, then, a single distortable font file cannot be provided that will generate a wide variety of fonts (with a corresponding variety of character topologies and typographic nuances) without becoming exponentially large and requiring an unacceptably long generation time. This problem is substantially compounded if additional scalable typefaces are assigned to points internal to an n-dimensional hypercube defined by the distortion axes; these intermediate typefaces are required to allow more complex interpolation rules to be defined. In practice, then, distortable typefaces implemented for a computer system with finite storage and speed can produce a large number of fonts, but only within a design space of limited dimensions, i.e., allowing only a limited number of parameters that can be varied between the different fonts that are produced.

Utility software also exists that can convert from one format to the other, and/or distort the original font character outlines. However, the results of such conversion are often poor replications of the original font.

An ideal font supply system that is capable of rendering a wide variety of digital typefaces would have distinct advantages over these prior art font creation and distribution technologies. In particular, it should satisfy three requirements: (a) it should be able to generate characters from digital font data at least as fast as a display rasterizer can display the characters on an output device; (b) the system for generating fonts and the data that define each font should occupy only a small fraction of the electronic storage space (either static or dynamic) required by the operating system; and, (c) the system for generating fonts and the data that define each font should be easily portable from one operating system to another. None of the prior art schemes for developing fonts and supplying those fonts to an end user effectively meets all of these requirements.

In addition, a font creation/generation system should be able to override the font generator execution state at any time, allowing high-fidelity font replicas (as well as original typefaces) to be produced without explicitly providing the values of all possible variables in the input parameter files. Instead, the majority of variable values should be computed from global variables or constants that are valid for all characters in the font, or are assigned unique default values in the function describing the character itself. Following this approach, only a few input parameter values would need to be stored in the binary parameter files defining a font and these files would likely be small in size, e.g., requiring less than two kBytes of hard disk storage space for each font. Again, none of the prior art has this capability.

An additional desirable feature of the font creation/generation system would be the ability to easily extend character generation instructions to include new glyph topologies. In the font generation shop, a new function containing source code describing the new font topology could then be added to the list of active font generation functions and then compiled into a binary file. In the field, a compiled glyph binary code describing an outline unique to a particular typeface should be able to read from a parameter file to make a runtime addition to the binary file defining fonts on the system.

SUMMARY OF THE INVENTION

The present invention provides a technique for rapidly creating, specifying, replicating, generating and/or supplying high-quality digital fonts. The invention may be used, for example, to create new digital typefaces in a format native to one or more computer operating systems, or to enable electronically produced documents to have essentially the same visual appearance on a wide variety of display devices. Some or all aspects of this invention may be incorporated into a wide variety of software (including operating systems and application programs) executed on digital computer hardware, as well as implemented directly in hardware.

In accordance with one aspect of the present invention, a method for creating and/or specifying fonts on a computer that can be generated on another computer comprises the steps of defining universal font generation rules that include: (a) instructions for computing variables used globally to specify fonts; (b) instructions to build glyphs, parts of glyphs, and composite glyphs that comprise portions of characters included in the font; (c) a character map that identifies the characters that will be included in the fonts; and, (d) global constants that are used to specify the fonts. Next, font parameters that specify characteristics of individual characters comprising a specific font are defined to fully characterize the outlines of the characters in the font, when combined with the universal font generation rules. The universal font generation rules are translated into a universal font generation file that is stored on a medium distributable to other computers. Likewise, the parameters are translated into parametric data for each font that is specified. The parametric data are relatively small in size compared to the universal font generation file and are readily distributable to an end user. A font generation program that is also distributable to an end user is provided to apply the font parameters in the parametric data to the universal font generation file to generate the characters comprising the specific font specified by those parameters.

Preferably, the method includes the optional step of measuring characters of an existing font to determine the parameters used to produce the parametric data, so that a font including characters substantially identical to the characters of the existing font is generated by the font generation program. In addition, the method includes the steps of comparing a character of the existing font with a character generated by the font generation program, and modifying the parameters used to produce the parametric data so that the character generated more closely matches the character of the existing font. To implement the step of comparing, the character generated is overlayed with the character of the existing font on a computer display screen to visually determine differences between the two characters. The step of modifying comprises the step of changing at least one parameter defining the character generated to more closely align with the character of the existing font.

The step of defining universal font generation rules includes the step of defining hinting fragments that are bound to selected glyphs and/or parts of glyphs to achieve hinting of a font. Use of the hinting fragments is determined by the font parameters.

The step of defining font parameters also preferably includes the step of defining metric and kerning data for the font.

A default set of font parameters is initially assumed, but any default font parameter is overridable to define the font parameters for a specific font. The font parameters defining a font, at least in part, are preferably based on a PANOSE typeface classification number for that font. In the preferred form of this method, the step of defining the font parameters is implemented in a graphics environment, enabling a selected character of a font being specified to be graphically displayed in detail, so that the effect on said selected character of varying values of the parameters is readily observed. The step of defining parameters is, in one mode, directed to specifying parameters for characters of a new font, but can be applied to changing the characters of an existing font to create a new font.

Another aspect of the present invention is directed to a method for generating characters of a selected font on a computer, for display on an output device. The method includes accessing a universal font generation file, for input to the computer. This universal font generation file is as defined above. Font parametric data that include font parameters specifying characteristics of individual characters comprising the selected font and thereby fully characterizing the outline of the characters when combined with the universal font generation rules are then accessed. A font generation program is executed that applies the font parameters to the universal font generation rules to generate at least one outline font character of the selected font. At least one outline font character is formatted in a font format appropriate for display on the output device.

In one embodiment of the invention, the font generation program is executed while an application is running on the computer, and the application determines one or more outline font characters to be generated. In another embodiment of the invention, an operating system used by the computer executes the font generation program and provides the parametric font data to the font generation program to generate a font. In still another embodiment, an application running on the computer executes the font generation program and provides the parametric font data to the font generation program to generate a font.

The font generation program is alternatively executed in an integral hardware module that is coupled to the computer.

Preferably, the font generation program is executed on the computer in a graphics environment, said graphics environment controlling selection of the font. Different font parametric data are provided for access by the computer for each font that is to be displayed and/or printed. The graphics environment includes an option enabling a user to select a font and thereby accesses the font parametric data for the font that is selected. The same font generation program and universal font generation file are used for each such selected font.

In another embodiment, the font generation program is executed as a background task, to display characters of the selected font on the display screen in response to corresponding characters being selected by a user on a computer input device.

Preferably, in one embodiment, at least one of the universal font generation file, the font generation program, and the font parametric data is stored in ROM. It is also contemplated that the font parametric data are associated with a document file and are transferred with the document file to another computer. The font parametric data for each font are typically less than two kBytes in size.

The step of executing preferably includes the step of binding kerning and metrics to the font format. The step of executing can include the step of generating hints to be bound to characters of a font. A further step involves translating the font format into a different font format. This step can include the step of binding hints to characters in the different font format that are appropriate for display on the output device.

At least one parameter of the font parametric data can be selectively overridden when the font generation program executes. In the preferred form for practicing this method, the parametric font data for a font at least in part, include a PANOSE typeface classification number for that font.

A system for creating and/or specifying fonts, and a system for generating characters of a selected font are still further aspects of the present invention. These two aspects include elements that perform functions generally consistent with the method steps discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 12 is an exemplary screen view from the graphics environment showing a portion of the Terafont rules and override values in parametric data, which together are combined to generate an upper case E.

DETAILED DESCRIPTION OF THE PREFERRED EMBODIMENT

Mathematical Representation of a Font

Figure 1:
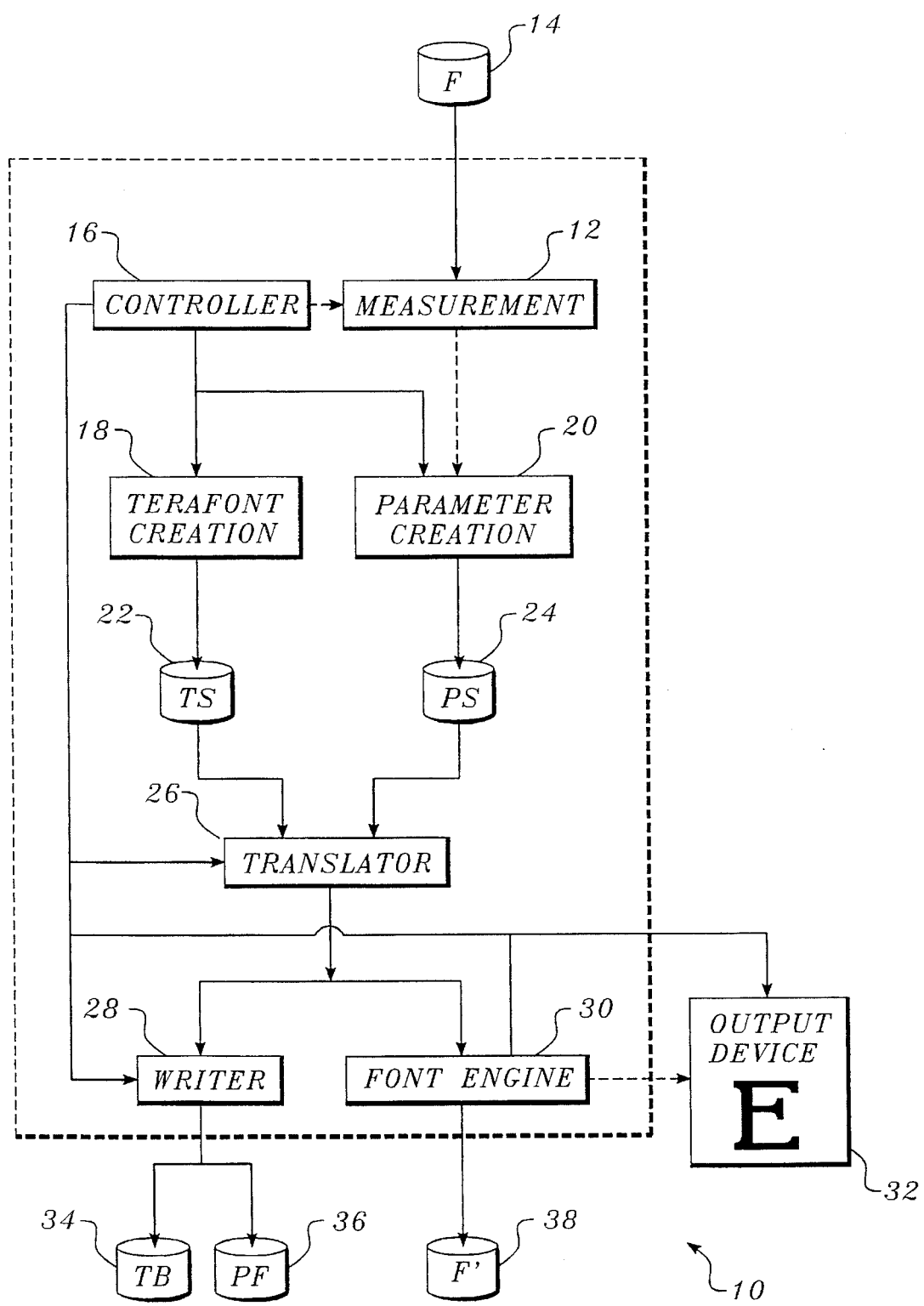
FIG. 1 is an abstract functional block diagram of an INFINIFONT™ font development system used for creating, specifying, and editing fonts in accordance with the present invention.

Consider a font F defined as a set of n characters $c_n$, which have outlines that in turn consist of paths $p_{nk}$. Mathematically, the font F can be expressed as:

$$F = \{c_n\} \quad (1)$$

and the characters can be expressed as:

$$c_n = \{p_{nk}\} \quad (2)$$

These paths can be represented graphically as a collection of on-curve and/or off-curve points, with rules that specify how to connect the on-curve points, given, for example, the positions of the off-curve points. Generally, there are additional components of a digital font designed to enhance its visual appearance when displayed electronically by an operating system on an output device (such as on a computer monitor, or on a printed page produced by a computer and connected printer). First, virtually all scalable fonts (i.e., font outlines that can be scaled to many different sizes) also carry special control programs, called "hints," that instruct the operating system to adjust the shapes of characters in that font prior to rasterization (conversion to a bitmap representation) for display, particularly at small point sizes where the resolution of both the display device and the human eye significantly affect the apparent perceived shape of the characters. Second, digital font files also contain "metric data," which instruct the display device to place characters on a page in certain relative positions, specifying a certain amount of white space in both ordinary (character advance widths, line spacing) and extraordinary (kerning widths) situations.

Consider further a measurement system M capable of operating on a target font F, which may or may not be initially represented digitally. In the shop, a (possibly non-linear) measurement operator, M, can be applied to this font, yielding a set of measurements, E:

$$E = \{e_m\} = M(F) \quad (3)$$

where $e_m$ is a measure m of the set E. Note that if the measurements are made on the entire font, rather than only on individual characters, the measures may include metric data. In some cases, the measurements E are generated without explicit reference to an existing target font; instead, the measures are designed ab initio for the purpose of producing an original font. These measures will determine values for such parameters as proportion of character sizes to each other, contrast (relationship between the member pans of characters), stroke variation, letter form, midline position, height of lower case relative to upper case characters, and arm form.

The measures can subsequently be convened to a corresponding digital format, D, using a conversion operator, C; this conversion operation may include hints, which are necessary for a faithful rendering of the original typeface, particularly at smaller point sizes, and may include other data needed to initialize the font generation subsystem.

In the field, a digital font generation operator, G, acts on the digital format, D, to create a digital representation, F', of the target font, F:

$$F' = G(D) = G[C(E)] \quad (4)$$

In principle, it may be necessary to apply another conversion operator to translate the digital representation into a format understood by, i.e., native to the operating system.

Clearly, if a high-fidelity digital rendition of the original typeface, F, is required, where F'≈F, then:

$$G[C()] \approx M^{-1}() \quad (5)$$

where:

$$M^{-1}[M(F)] = F \quad (6)$$

Of course, if the measurement operator, M, describes a "many-to-few" transformation, the inverse operator, $M^{-1}$, may not exist; the corresponding font replication fidelity would be limited by the number of measurements in the set E.

As noted above, there are additional requirements that should be satisfied by an ideal font supply system, including:

1. The font generation operator, G, should be able to generate characters from the digital data, D, much faster than the fastest human typist, and ideally as fast as a display rasterizer;

2. The font generation operator, G, and the digital data, D, should occupy only a small fraction of an electronic storage space (either static or dynamic) required by an operating system; and 3. The font generation operator, G, and the data, D, should be easily portable from one operating system to another.

The word "INFINIFONT" is a trademark that is expected to be used in connection with the system in accordance with the present invention for creating, specifying, and generating fonts. The technology underlying the INFINIFONT™ system is described in detail below. TABLE I, which follows, compares the corresponding operators E, D, C, and G for the prior art bitmap, scalable, and distortable font formats with those of the INFINIFONT™ system.

TABLE I

| Technology | Data | Operators |
| --- | --- | --- |
| Bitmap Fonts (e.g., METAFONT) | E: Numeric input parameters<br>D: Bitmap font file | C: METAFONT program<br>G: Bitmap file reader (+display) |
| Scalable Fonts (e.g., TrueType 1) | E: On/off-curve point positions, metrics<br>D: TrueType font file (smaller than bitmap font file; includes headers, points, hints, and metrics) | M: On/off curve point position determination (electronic or visual)<br>C: Commercially available font design tool<br>G: TrueType subsystem (+rasterizer and display) |
| Distortable | E: On/off-curve | C: Font design tool |

TABLE I-continued

| Technology | Data | Operators |
| --- | --- | --- |
| Fonts (e.g., MULTI-MASTER) | point positions, metrics for specific scalable fonts<br>D: MULTIMASTER data file (includes metrics) | G: MULTIMASTER font file (includes headers, points, metrics, hints and interpolation rules; excludes data) and MULTIMASTER subsystem (plus rasterizer and display) |
| INFINIFONT | E: PANOSE numbers, override strings, metrics<br>D: Parameter binary data file (much smaller than bitmap, scalable, and distortable font files; includes headers, PANOSE numbers, override strings, and metrics) | M: PANOSE measurement system, with user interface for editing<br>C: Font development system<br>G: Font generation system (includes Font Engine and Terafont binary - hints; plus optional translator, rasterizer, and display) |

Overview of Font Development System for Creating and Specifying Fonts

A font development system 10 in accordance with the present invention is shown in FIG. 1 for assisting typographers in creating a set of universal font generation rules (referred to herein as a "Terafont") applicable to virtually all fonts having a specific generic alphabet in common. For example, a different Terafont would be used to specify universal font generation rules in each of the Roman, Kanji, and Cyrillic alphabets. Although the Terafonts for different alphabet types may have certain similarities to each other, it will be apparent that there are different numbers of characters in each type of alphabet, and in the case of the Kanji alphabet, substantially different numbers and forms of characters than in the Roman alphabet. Nevertheless, the font development system 10 has the capability to produce an appropriate Terafont for virtually any type of alphabet, so that fonts in that alphabet can readily be developed for distribution and used by many other people on other computers.

Abbreviations used in the Figures and throughout this discussion include: "TS" for "Terafont source" and "TB" for "Terafont binary," both of which represent the INFINIFONT™ Terafont in different formats; "PS" for "parameter source" and "PF" for "parameter binary data file," both of which represent INFINIFONT™ parametric data that uniquely specifies each font, in different formats.

Font development system 10 can be used to create an entirely new font, without any reference to an existing font (visually or otherwise), or can be used to modify an existing font, either to simply change one or more characters in it, or to modify it extensively to create a new font based on the existing font. In addition, the font development system can be used to reproduce or replicate an existing font that is normally distributed in a prior art format, so that a visually equivalent font is available in the INFINIFONT™ system. Such a replication will be important to achieve the advantages of small size, distributability, and real time generation of the font that the present invention provides. Normally, font development system 10 will be used in the shop to produce new or modified fonts; however, it is also contemplated that it will be provided to end users, either in a complete and fully functional form, or in a form with limited functional capabilities, for example, permitting only editing of existing fonts.

A font measurement block 12 in font development system 10 represents means for measuring an existing target font 14, to produce parametric data characterizing that font, either for replicating the existing font, or for producing a new font that is based on the existing font. The means for measuring include software implemented measurement tools, which allow visual characteristics of a particular displayed existing target font to be determined and represented parametrically as numeric data in text format. These measuring tools can be used to determine a PANOSE™ number for the existing font that provides a nearly complete definition of its characteristics. Alternatively, these measurements can be carried out manually. Details of the PANOSE number font classification scheme are discussed below.

Preferably, font development system 10 runs as application software under a graphics user interface on a conventional personal computer. A personal computer system appropriate for this purpose is shown in block diagram in FIG. 2 and details of the computer are discussed following this disclosure of the functional aspects of the font development system. Font development system 10 includes a controller 16, which handles the overall control of the system and interacts with the user to implement a selected function. All other functional blocks comprising the font development system respond to and run under the controller in response to selections and input made by the user.

The two primary functions for which the font development system is designed are represented in this Figure by the functions identified as Terafont creation 18 and parameter creation 20. Generally, for a given type of alphabet, the Terafont (universal font generation rules) will not need to be modified once they are correctly defined. However, as a practical matter, the Terafont is likely to be developed and refined over a period of time, for each type of alphabet. Thus, the font development system includes Terafont creation 18 as a functional capability of the font development system, even though this function is likely to be little used after a Terafont has been finalized for a given type of alphabet. Terafont creation 18 yields a Terafont source file 22, which is a clear text format recitation of the universal font generation rules for a type of alphabet, somewhat analogous to a source code listing for software. In the preferred form of the invention, the Terafont source actually comprises many small files. For example, the universal rules applied to each character glyph comprise a plurality of files *.TSF, a few of which are shown in the left column of FIG. 11.

After Terafont source file 22 is created and finalized, most of the use subsequently made of the font development system is directed to parameter creation 20. To define a font in the preferred embodiment of font development system 10, at a minimum, the user must specify a PANOSE™ number for the font. In addition, various other parameters can be selected and default values for parameters can be overridden to completely characterize a font visually. The parameters that are thus defined are edited and written into a parameter data source file 24.

A translator 26 that carries out both compiling and assembly functions, produces Terafont binary data, which a writer 28 saves in a Terafont binary data file 34, for example, on a floppy disk or in another non-volatile storage medium (not shown). Similarly, the parametric source data are compiled and assembled, and written by writer 28 in a binary format, to a parametric data file 36. It should be noted that the compilation and assembly carried out by translator 26 does not produce machine language code intended to execute directly on a processor. Instead, the Terafont and the parametric binary data for an output font specified using the font development system are compiled and assembled into a binary language format suitable to be executed by a font engine 30. As explained in detail below, font engine 30 can be executed as part of a run time system on a different computer to generate each font defined by a corresponding specific set of parametric data. However, in order to display the font currently being specified so that the parametric data defining it can be modified during the font creation and editing process, font engine 30 is also included in font development system 10.

Font engine 30 applies the universal font generation rules comprising the Terafont binary data to the parametric binary data to produce a new, edited, or replicated output font 38. Details of this process are explained below. Output font 38 is represented in FIG. 1 by F', consistent with the above-noted mathematical development resulting in Equation (4). In addition, font engine 30 applies any reformatting of the font required to display it on an output device 32. For example, font 38 may be reformatted into Adobe Corporation's PostScript™ format, or into the TrueType™ format for display on output device 32, when running under Microsoft Corporation's Windows graphic environment. Output device 32 is intended to represent any device upon which a visual representation of one or more characters of a font 38 is displayed.

Figure 2:
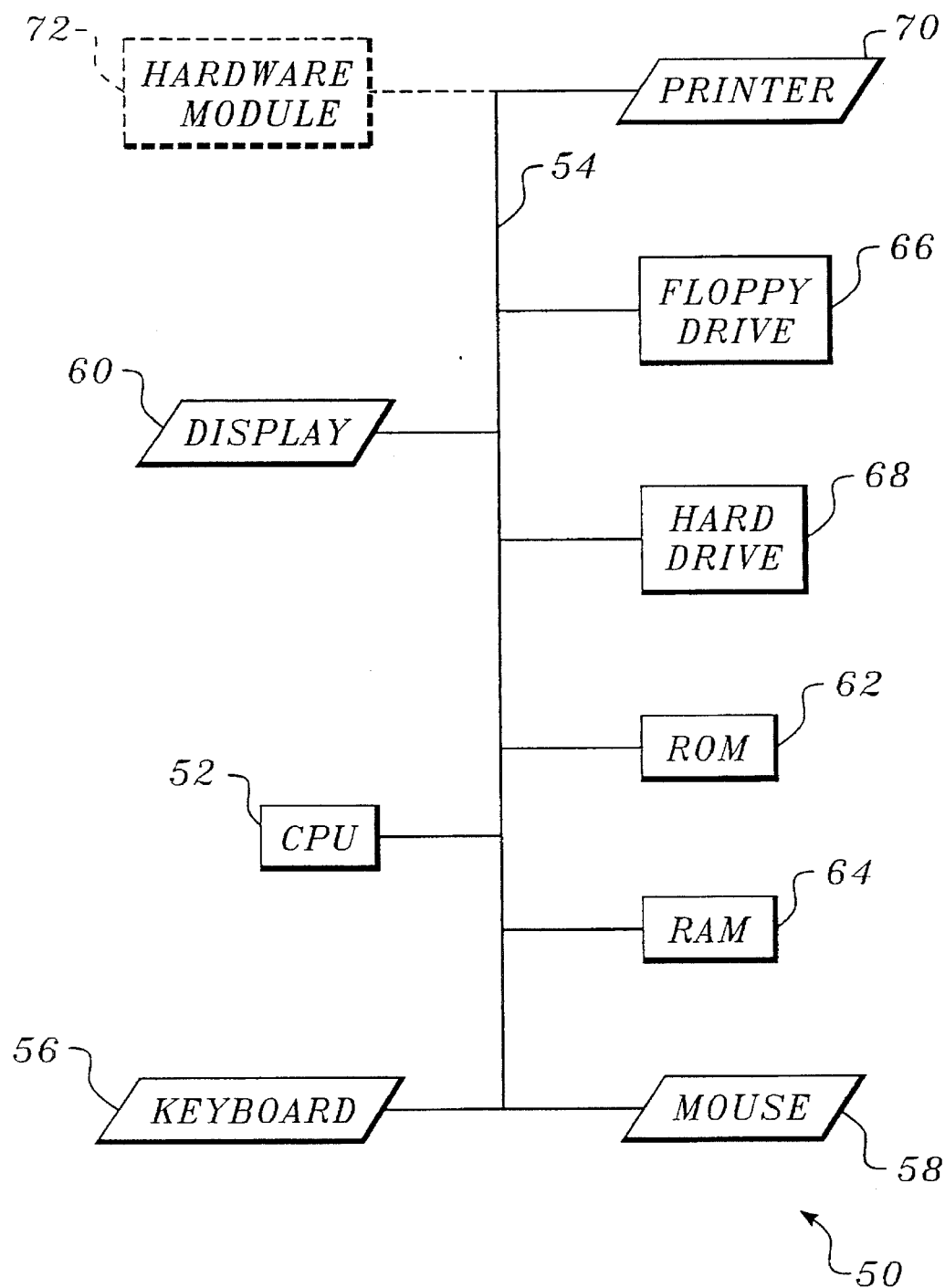
FIG. 2 is a block diagram of a computer suitable for developing and/or generating fonts in accordance with the present invention.

FIG. 2 is a block diagram of computer 50, suitable for executing font development system 10. Computer 50 includes a CPU 52 (but may include a plurality of CPUs, as parallel processor computers become more readily available). Those of ordinary skill in the art will appreciate that details of computer 50 are omitted to simplify this drawing. CPU 52 is electrically coupled to a signal bus 54 that conveys digital signals bidirectionally between the CPU and other components of the computer, including a keyboard 56, a mouse 58, non-volatile ROM 62, and random access memory (RAM) 64. The keyboard and mouse are input devices that allow an operator to interact with the font development program by making decisions to which controller 16 responds, and by entering parametric or Terafont source data. Mouse 58 (or some other appropriate pointing device) is used when executing the font development system in a graphics environment, for selecting menu items, selecting text for editing, and other conventional input and selection functions. Also coupled to signal bus 54 are a floppy drive 66 and a hard drive 68. To display the output of programs executed on computer 50, a display 60 (monitor) and a printer 70 are also coupled to the signal bus.

Since it is contemplated that one or more of font engine 30, Terafont binary data file 34, or binary parametric data file 36 might optionally be distributed, embodied in an integral hardware module 72, comprising, for example, an application specific integrated circuit (ASIC), FIG. 2 illustrates the coupling of such a hardware module to the signal bus, but uses dash lines to indicate that hardware module 72 is optional. It is also possible to provide the hardware module as a component inside or directly coupled to printer 70, to facilitate generating font characters on the fly, before they are printed. Clearly, the entire font development system or a functional subset of it could be implemented as an integral hardware module, independent of computer 50, or for use in other types of computers, such as a pen computer (not shown). These and other variations of the hardware components in which font development system 10 is executed will be apparent to the skilled practitioner.

Description of The Terafont

In the present invention, the Terafont is an abstract body of typographic knowledge, which comprises a collection of universal font generation rules that instruct font engine 30 to build the character outlines in a font, by applying these rules to the parametric data that uniquely define each font. Generally, the Terafont includes instructions that compute the values of variables that will be used globally throughout the font (the "Terafont globals"), as well as instructions needed to build glyphs, parts of glyphs, composite glyphs, and perform general-purpose computations (the "Terafont functions"). To synthesize a complete font, the font engine first executes a global font routine, and then a routine for producing each character (e.g., A, B, C, etc.) in turn. To synthesize a single character, font engine 30 executes the global routine and then the routine for a single character. In the preferred embodiment, the font engine employs a caching scheme to store the results of the global routine execution, so that subsequent characters may be synthesized without re-executing the global code.

Preferably, the Terafont supports "function" constructs much like stack-based languages such as C, Pascal, and FORTRAN. As in these and other languages, the use of functions allows the total Terafont to be small and easy to create and maintain. The Terafont source language is similar in some ways to the C programming language, with support for special data types and opcodes that allow for efficient construction of outline curves and hint constructs. A more detailed description of the constituent elements of Terafont source file 22 follows.

Terafont Global Routine and Functions

The global routine consists of instructions to calculate several hundred global variables. These variables define properties and measurements, and are used by the individual character routines. In addition, the global routine includes instructions for allocating and defining special constructs used for generating hints.

In the preferred form of the invention, Terafont globals fall into one of several broad classes, defined as follows:

1. Character Map

A list of characters to be included in the font, with a corresponding list of Terafont functions needed to generate those characters. The characters are assigned a Unicode Worldwide Character Encoding standard identification number (defined by the Unicode Consortium).

2. Constants

A list of names representing allowed Terafont source data types, which are assigned constant numerical values. These constants can be accessed by other Terafont globals and any Terafont function.

3. PANOSE™ Globals

A set of global variables whose values represent the measurements made on a target font, F, to determine the PANOSE™ number of that font. These variables are computed using a PANOSE™ number as input.

4. Global Variables

Other global variables whose values represent numeric typographic characteristics of a font that are not measured to determine a PANOSE™ number, but that are measured to provide high-fidelity replication of a target font. In principle, all variables in the Terafont could be considered to be global; however, since some of these variables would be used by only one glyph under certain circumstances, this choice would be highly inefficient, particularly when the font engine is operating to produce only a single character. Hence, the choice of whether or not to define a particular variable as global is made on the basis of efficiency.

5. Format-Specific Globals

Additional global variables can be named and defined as needed to support a specific font format, such as TrueType™ or PostScript™.

The preferred types of source code for a typical Terafont global source file is shown below in TABLE II. The Terafont source code representing this global code need not be divided into the specific sections shown, and the sections in this embodiment are not necessarily required to be arranged in the order shown. With the exception of Overrides, the font engine executes instructions in the same order that they are written into the Terafont source files. Hence, TABLE II also represents the execution flow for Terafont globals having this structure.

TABLE II

PANOSE-Dependent Global Variables (Never Overridden)
PANOSE-Independent Factors
Computed Global Variables (Rarely Overridden)
Default Variables
Computed Distances (Rarely Overridden)
Computed Global Hinting Variables The compiler and assembler comprising translator 26 generate Terafont binary code that causes font engine 30 to prepare for execution of subsequent instructions. For example, Terafont constant data space may be allocated and then filled; global data space is allocated; and then the parameter source file is accessed and read. In the preferred embodiment, the present invention uses numerical data obtained from the PANOSE™ typeface classification system as the minimal data set required for producing a font. (See the discussion below of parametric data for a more detailed explanation of how the PANOSE™ typeface classification system provides specific advantages). The computation of the Terafont globals includes the following steps:

a. Compute PANOSE-dependent global variables. Compute those global variables that represent measurements performed to determine a PANOSE™ number. These variables should never be overridden, since the output font, F', could then fail to reproduce the input PANOSE™ number if measured.

b. Assign PANOSE-independent global factors. Assign default values to those global factors that do not depend directly on PANOSE™ numbers. At this stage of the Terafont execution, these factors should generally represent ratios of distances between typographic characteristics not represented by PANOSE™ numbers. These factors allow global distances to be computed in step 5 in terms of fundamental distances, such as the height of the uppercase X character or the width of the uppercase H. In fact, these values will often be overridden when high-fidelity replication of an existing font is desired.

c. Compute dependent global variables. Compute the values of global variables (such as ratios and angles), which depend on combinations of the variables determined in steps 1 and 2. These dependent global variables are used often throughout the Terafont; hence, storing them in the global data space results in a more efficient Terafont. These variables are rarely overridden, since they generally depend on the results of step 2.

d. Assign other default global variables. Assign default values to other global variables which represent absolute typographic characteristics, such as distances and angles. These variables will not scale with other typeface features, and will often be overridden.

e. Compute distances. Compute absolute distances between global typographic characteristics not represented by PANOSE numbers using the results of the previous four steps. These distances may represent the thickness of serif tips, the widths and heights of most uppercase characters, or other visual features.

f. Compute global hinting variables. Compute those global variables that will be required for hinting and which will be bound to the font characters that are output.

In the preferred embodiment, the Terafont constant and global data spaces remain intact until font engine 30 is deactivated. However, if the font engine is operating to produce a single character rather than an entire font, the Terafont data space can be stored or cached for later use when the font engine is reactivated to generate another character.

6. Terafont Functions

Each character routine uses the global variables and synthesizes a single character. The results include both the character outline as well as the hinting constructs required by an operating system to generate a high-quality raster image. For the TrueType™ font format supported by Microsoft™ and Apple™, the hinting constructs themselves are small routines that are executed by the rasterizer provided by the operating system. In a very real sense, the INFINIFONT™ character routines are automatic code generators.

In the preferred embodiment, Terafont functions fall into one of several broad classes, including:

1. Wrapper

A top-level function that binds one of several different topologies to one character Unicode value. (See the discussion of the Unicode character mapping standard in the description of parametric data files above.) A wrapper function will generally call a particular glyph function depending on the requested topology. If a particular character in a Terafont has only one basic topology, then the Unicode value may be bound directly to the corresponding glyph function. The Terafont function required to select between the lowercase "a" and italic "a" topologies falls into this class.

2. Glyph

A function that contains all of the Terafont source data needed to generate a glyph for a given topology, including metrics coercion and computation, and hinting code.

In the preferred embodiment, wrapper and composite functions call glyph functions, which in turn call part and hint functions; a calculator function may be called by any other function.

A typical Terafont glyph function is listed below in TABLE III. The Terafont source code representing this function need not be divided into the specific sections shown in this table, and the sections in this embodiment are not necessarily required to be arranged in the order shown. With the exception of overrides, the font engine executes instructions in the same order that they are written into the Terafont source files. Hence, TABLE III also represents the execution flow for a glyph function with this structure.

TABLE III

Figure 9:
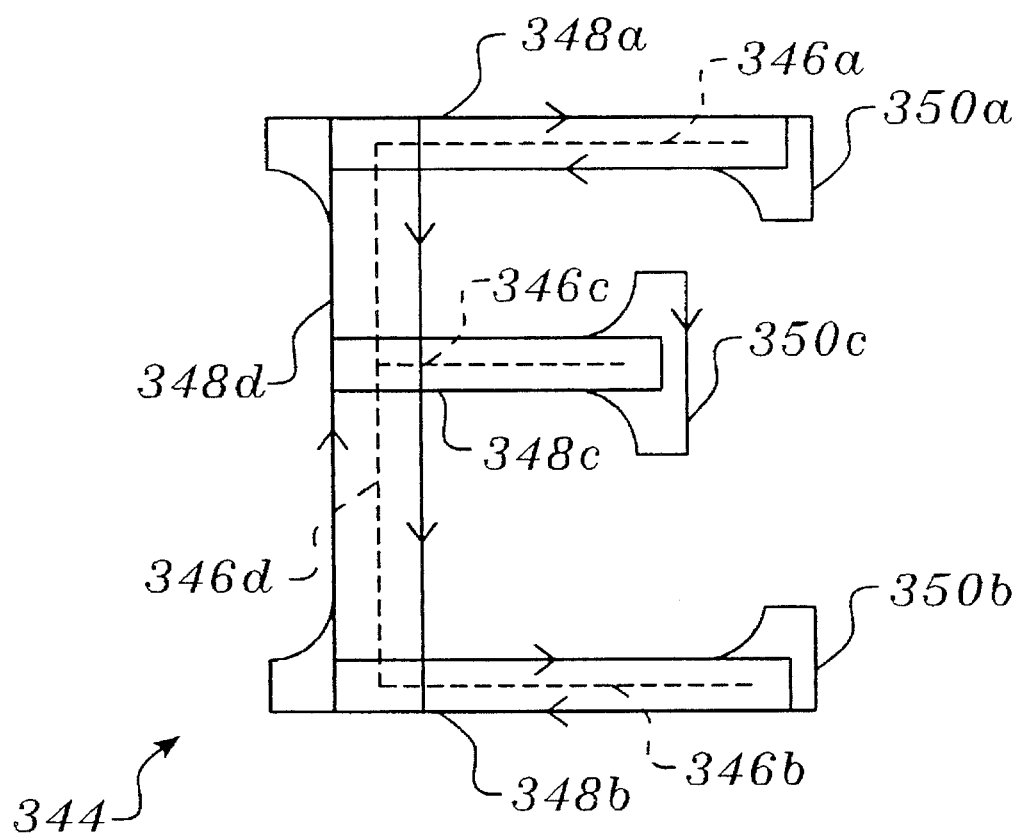
FIG. 9 is an exemplary schematic view of the visual typographic components required to the synthesize a serifed uppercase E.

Name
Inputs
Get Metrics (Possible Coercion)
Ratios and Distances
Frames and Stems
Features
Connectors
Obliquing
Set Metrics TABLE III-continued Hints
Returns The glyph function is assigned a unique name that is registered by the compiler comprising translator 26. The glyph function input parameters (if any) are listed in a particular order and assigned default values that will be used in the absence of a passed-in value. The compiler and assembler generate Terafont binary code that causes font engine 30 to prepare the system state for execution of subsequent instructions. The generation of a glyph outline includes the following steps:

a. Get metrics: Establish the size of the glyph outline in the design space. In cases where high-fidelity replication of an existing font is desired, metric values can be retrieved from the parametric binary data and then "coerced" (adjusted) to more closely align the outline of characters of the replicated output font with the outline of characters in the existing font. In cases where precise metrics-matching is unnecessary, metrics can be defined in terms of globally defined variables or constants.

b. Compute ratios and distances: Needed ratios of frame, stem, or feature sizes to one or more globally or locally known scale distances can be defined in terms of global or local constants or variables. Additional distances, such as heights, widths, and thicknesses can subsequently be computed using these ratios, or defined in terms of global variables.

c. Build frames and stems: Build the fundamental constructs defining a particular topology; generally represented by paths. As shown in FIG. 9, frames 346a through 346d for a particular topology of an uppercase E character 344 can be used to define the positions of corresponding stems 348a through 348d, with thicknesses determined in step (b). As the stems are synthesized, tags are assigned to special points for hint references.

d. Build features: Build typographic features such as serifs, hooks, and finials (if necessary), generally represented by paths; these features can be produced based on the positions of stems 348a and 348b, as shown by features 350a, 350b, and 350c in FIG. 9. Note that only those points necessary to define the paths comprising a particular feature are created. As the features are constructed, assign references to special points for hinting purposes.

e. Connect and lace. Build character outline paths between stems 348, between features 350, and/or stems 348 and features 350 to close an outline (if necessary). The paths placed in the design space that represent stems and features are then laced together to form a minimum number of unique closed contours for a given glyph topology. In some cases, two paths extend beyond their point of intersection; they are then trimmed and joined to form a single new path. To lace the paths together, the font engine implements path intersector optcodes, working around the character outline (as shown by the arrows in the Figure) to join and trim the various character outline paths that are used to construct a character. As the paths are laced together, the list of valid point references for hinting must be updated.

f. Oblique: Slant glyph outlines to produce italic characters. In the cases of either a nonitalic font or a glyph that was generated in obliqued form, this step is not necessary.

g. Set metrics: Set the metrics for the character after it has been generated and add them to the glyph database. The font engine can compute the "black width" of the glyph outline and combine the result with other metric data obtained in step (a) to set the metric state for any characters incorporating this glyph.

h. Set hints: Process any hint programs defined in the Terafont source and add them to the glyph database. In the preferred embodiment, special point references are already assigned as the glyph function is executed. Therefore, feature identification has been completed during glyph synthesis; there is no need for additional hint programs to determine the positions of interesting points, stems, and features after the outlines have been generated.

In the preferred embodiment, a Terafont glyph function will always return a glyph outline consisting of one or more closed contours. This glyph outline can be displayed by font engine 30 on output device 32 (e.g. display 60 or printer 70—see FIGS. 1 and 2) running under the graphic environment, or can be digitally reformatted and written to either volatile or non-volatile memory for use by a computer operating system or application software.

Significantly, in the preferred embodiment the local variables defined in the Terafont glyph source code are either provided with default values, or computed in terms of other variables that have been assigned default values. These default values are set in terms of global variables, global constants, or local constants. Hence, every glyph function is capable of generating an outline, even in the absence of input variables. At any point during the execution of the Terafont binary data representing this glyph function, values of variables local to the glyph function or its dependents can be overridden using data provided in the parametric data for the font. However, only a subset of the local variables need be overridden to provide high-fidelity replication of an existing target font; variables that have a marginal effect on the glyph shape for a particular font are allowed to maintain their default values. Therefore, in the preferred embodiment a significant reduction in the size of the parametric data is obtained, compared to the size of font files required in the prior art.

3. Composite

A special type of glyph function that binds two or more glyph functions to a single Unicode value. The Terafont function required to build a character such as "Ä" falls into this class.

4. Part

A function that contains the Terafont source code needed to generate part of a glyph, such as a stem, a serif, a hook, or a finial. It requires input parameters and does not contain metrics source code. In some cases, a part may contain hint code, but generally it creates point references, which are returned to the calling function for hinting execution.

5. Calculator

A function that provides a general service that could be called to produce any glyph or part. In many cases, a calculator function can be more efficiently implemented and executed as font engine opcodes.

6. Hinting

A function that processes and generates hint fragments, which are generally technology (i.e., font format) dependent. In some cases, a hint function returns a hint fragment after computations and logic performed using input or global variables; in other cases, a hint fragment may be defined by an input parameter from the parametric data.

Hints are small software functions (or routines) that modify a glyph outline prior to rasterization to enhance its visual appearance at display time, particularly at low resolution and/or small point sizes where distinct visual features of a character can be difficult to represent. Hint formats generally depend on the computer platform being used, since properties of the rasterizer vary from one operating system to another. The present invention does not require the use of a specific point-based hinting format; rather, a preferred embodiment of the hinting model used in the present invention provides an architecture that will support a variety of popular hinting formats, such as TrueType™ and PostScript™.

In the present invention, typographically interesting features such as stems and serifs are specified by the parametric data for a font and identified at synthesis time as the Terafont binary is executed by the font engine. They are neither explicitly installed in the shop for all fonts in the design space (as in the case of distortable fonts), nor are they identified by the hint instructions at rasterization time (as is required by some scalable font design tools). Rather, as the glyph is built, hint instructions are bound to the glyph that are specific to the features that are incorporated into the glyph.

Specific points in a glyph outline can be identified for later reference in a supported hint fragment construct. This method is implemented in Terafont source file 22 (FIG. 1) through a "pointref" (or "point reference") data type; variables of this type can be used to specify a particular point on a character outline path and then bound to the path. As the path is intersected, trimmed, transformed, and/or linked, font engine 30 updates the point reference so that it continues to indicate the original tagged point.

A considerable reduction in Terafont binary size is obtained in the preferred embodiment by globally defining hint fragments, or "font routines," which perform common hint instructions that are likely to be required by more than one glyph, and can be called by other hint fragments in producing a plurality of characters of the font.

Description of Parametric Data and PANOSE Classification Number

Parametric data file 36 (FIG. 1) contains binary data required to produce characters of a specific font when Terafont binary data file 34, which includes the universal font generation rules, is executed by the font engine. The parametric data preferably includes font name information, a PANOSE™ classification number, additional data describing globally known glyph measurement characteristics (if necessary) in the form of overrides to global variables, data describing overrides to specific Terafont functions (if necessary), metric data (including horizontal, vertical, and kerning information, if necessary), and additional format-dependent data (if necessary) providing information for use by the font writer.

A PANOSE™ classification system (known in the prior art) assigns a multi-digit number to a typeface that describes its predominant visual characteristics; font development system 10 provides measurement function 12 for optionally measuring different characteristics of an existing font typeface to generate an appropriate PANOSE™ number for the font.

In general, a PANOSE™ number is a data structure containing PANOSE™ "digits" (each "digit" is actually represented on computer 50 as a byte, and may in fact include several decimal digits), each of which represents a visual characteristic-like "weight" (heaviness of the strokes), "contrast" (ratio of the width of the thick to the width of the thin strokes), and "serif style" (e.g., sans serif, cove serif, or square serif). There is a separate PANOSE™ classification system for each generic type of alphabet (e.g., Roman, Cyrillic, or Kanji) and each class of typeface, or genre (e.g., Text and Display faces, Decorative faces, and Woodcut faces). Unlike other type classification systems, PANOSE™ classification systems work whenever possible on physical measurements of the type, rather than any subjective historical or artistic analysis. (In practice, physical measurements are only sufficient for the "base" genre within each script, such as Roman Text and Display. Other genre require somewhat subjective, although not artistic or historic, judgments.)

Prior to the present invention, PANOSE™ numbers have been used only for the purpose of determining an available font to substitute when a requested font is unavailable. The "distance" between the PANOSE™ number of the requested font and that of each available font on the computer system is computed; these numbers are then compared, and the available font with the closest PANOSE™ number to that of the requested font is substituted. The PANOSE™ system for any script and genre type is designed to make this possible. Substitution may occur within the same classification scheme, or across classification schemes in the case of "cross-literal" mapping.

In the preferred embodiment, PANOSE™ numbers offer a convenient set of measures for generic font production, but the present invention can alternatively employ other type classification schemes. Provided that the PANOSE™ measurement system for a particular script and genre is invertible (that is, that the inverse of the PANOSE™ measurement operator M exists), a given PANOSE™ number represents specific measurement data that provide a numerical description of the visual appearance of a typeface. Therefore, global variables are defined in the Terafont, which numerically represent those typographic features that are measured to subsequently calculate PANOSE™ numbers. This approach offers a special advantage for any computer environment that already uses PANOSE™ numbers for substitution; namely, if a close PANOSE™ number match cannot be found for a specific font requested, then a replacement font may be generated by font engine 30 of the present invention using the requested PANOSE™ number as the only parametric data that is input and used with the Terafont. Although the resulting replacement font may not be identical to the font requested, it will at least be very similar, limited only by the constraints and sophistication of the PANOSE™ typeface classification system employed.

Currently, the PANOSE™ system is available at two levels of sophistication. PANOSE 1™ classifies typefaces using a 10-byte "number," or data structure; it is ideal for closed systems where storage requirements are strict and the available fonts are well known. PANOSE 2™ classifies typefaces using a 35-word (16-bit element) data structure; it provides significantly richer measurement data than the PANOSE 1™ system. It is designed for extensible systems where fonts are regularly added and removed, using mixed languages and mixed font formats (including distortable fonts). The measurement data for these two classification systems are compared below in TABLE IV.

TABLE IV

| PANOSE 1.0 ™ | PANOSE 2.0 ™ |
|---|---|
| Family | Class |
|  | Genre |
| Serif Style | Serif Width Measure |
|  | Serif Tall Measure |
|  | Serif Tip Measure |
|  | Serif Hip Roundness |
|  | Serif Tip Roundness |
|  | Serif Angle |
|  | Serif Drop Measure |
|  | Serif Balance Measure |
|  | Serif Foot Pitch Measure |
|  | Serif Cup Measure |
| Weight | Weight Measure |
| Proportion | Monospace Flag |
|  | Distortion Measure |
|  | Ratio Measure |
| Contrast | Narrow Stem Measure |
| Stroke | Speed Factor |
|  | Stress-Up Angle |
|  | Stress-Low Angle |
| Arm Style | Stem Taper Factor |
|  | Stem Dishing Measure |
|  | Stem Bowing Measure |
|  | Stem Termination Angle |
|  | Low Serif Single/Double Flag |
| Letterform | Slant Angle |
|  | Outer Curve Factor |
|  | Side Flat Factor |
|  | Top Flat Factor |
|  | Bowl Mid-Out Factor |
| Midline | Mid 'E' Measure |
|  | Mid 'A' Measure |
|  | Apex Trim Factor |
|  | Apex Serif Flag |
| X-Height | X-Tall Measure |
|  | Diacritical Location |
|  | Cap-Scale Factor |

A key advantage provided by the present invention is the ability to closely replicate existing or traditional typefaces. There are two problems that must be solved before high-fidelity replication of a target font can be achieved: (1) matching the character advance spacing and other metrics, and (2) matching the glyph shape of each character. A failure to correctly match metrics within a target typeface is easily noticed. If even a single character in a font has been synthesized with a width that is only 1% larger or smaller than the character in the original font, a document in the original font may not paginate identically with a document in the replicate font. However, metrics matching is reasonably well understood and is solved by many font vendors simply by copying the relevant metrics from the target font to the newly generated font. Metric data generally comprise less than 5% of the size of a typeface font file; hence it is reasonable to copy the metrics into the parametric data (and then copy the parametric data for each font into a document in which the fonts are used). By copying the parametric data for each font used in a document into the file in which the document is stored, it becomes possible to reproduce the document in the same visual representation on virtually any compatible computer system, without regard for the fonts that are installed on each computer system. However, it is crucial to reconcile the metrics with the glyph shapes during font generation. While the glyph rarely fits precisely within the rectangle defined by the metrics, the relationship between glyph shape and metrics is critical to the design and appearance of the typeface.

The second part of the problem of reproducing a target font relates to accurately reproducing the glyph outline for each character in the target font. This part of the problem is solved by first specifying an appropriate PANOSE™ number, then specifying global override data and character specific override data to provide parametric data that update, at font generation time, those parameters that will significantly affect the final glyph shape of each character. As described previously, the larger the number of override inputs, the closer the contour approximation of the output font will match that of the existing target font character. Preferably, the most general override inputs are presented and applied first. This approach provides a reasonable "95%–5%" solution, where a very close approximation of an existing target font is represented in about 5% of the file size required to store the typeface using a conventional font format. Closely approximating well known typefaces, while maintaining the size advantage of the parametric data for specifying a font is a key advantage of the INFINIFONT™ system. The parametric data specifying a font can therefore always be scaled from low to high sophistication by increasing the number of detail strings used to describe a target typeface. On some platforms where both volatile and non-volatile storage space is limited (such as "notebook" personal computer), size (and closeness of approximation) can be reduced; on a mainframe, the closeness of approximation (and therefore the required size of the parametric data for a replicated font) can be much greater. TABLE V, which follows, is an exemplary listing of the sections identifying the type of information provided in parametric data for specifying an output font produced on font development system 10, which replicates the Times New Roman, TrueType font. The parametric data include a NAME section, and a PANOSE 1™ classification number. The other sections contain overrides for variables used with specific Terafont glyph functions and metric width information for each of the characters in the font.

TABLE V

Figure 3:
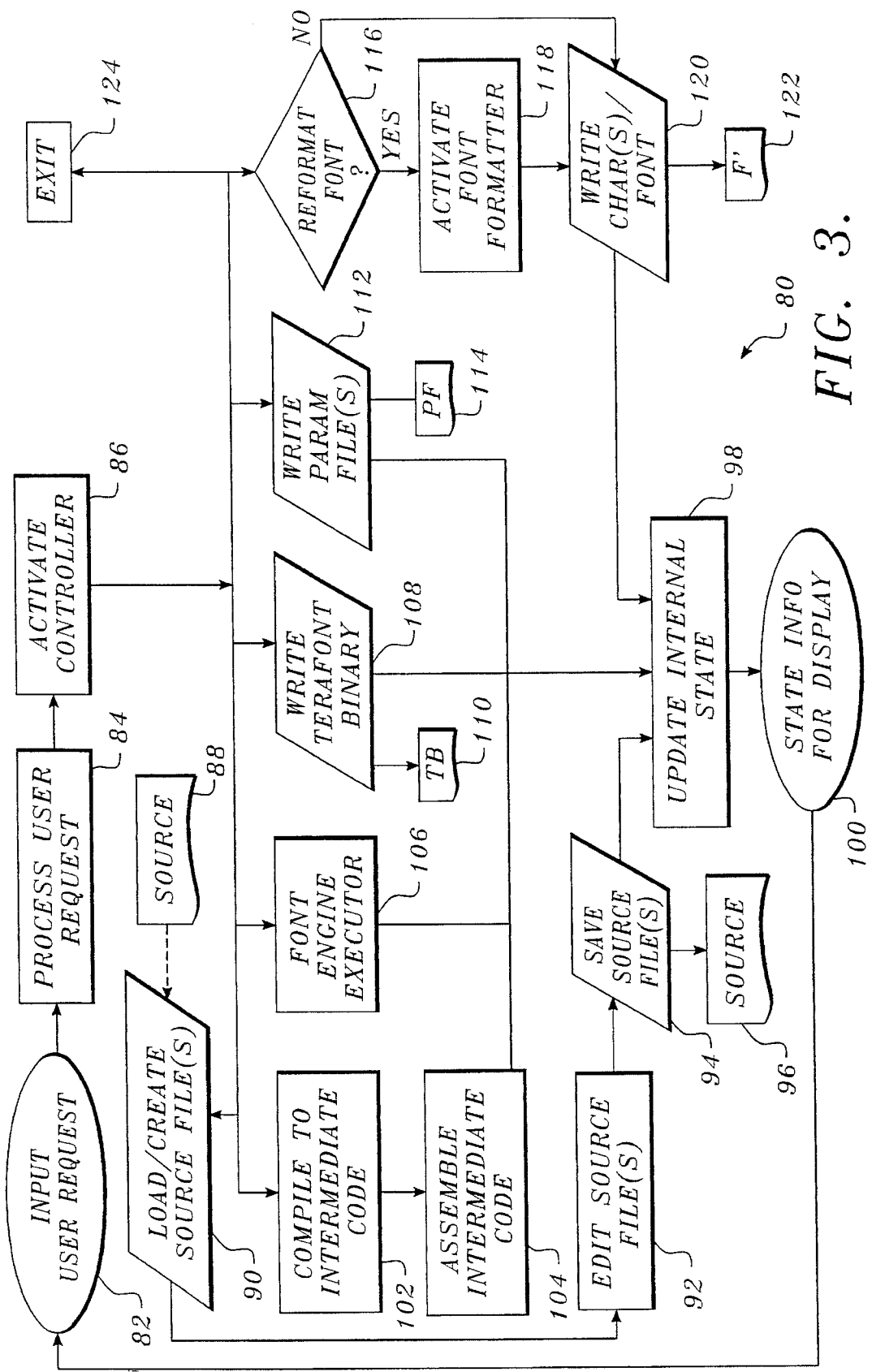
FIG. 3 is a flow chart illustrating various user requests that can selectively be implemented with the INFINIFONT™ development system.

NAME
    FONTNAME = "EC Times New Roman"
    FAMILYNAME = "EC Times New Roman"
    FAMILYSUBNAME = ""
    POSTSCRIPTNAME = "ECTimesNewRoman"
    BOLD = false
    ITALICS = false
NOTES
PANOSE
    2 2 6 3 5 4 5 2 3 4
GLOBAL_DETAILS
LOCAL
WIDTHS Turning now to FIG. 3, a flow chart 80 generally represents the steps implemented by font development system 10 in response to a request by a user. Flow chart 80 begins at a block 82 with the input of a user request, which may occur in response to selection of a menu item in a graphics environment. For example, the user may elect to create a Terafont data source for a particular alphabet, or create a parametric data file for either an entirely new font or a replication of an existing font. Other selectable options include editing existing Terafont files or parametric data, for example, to make changes necessary to fine tune the universal font generation rules in the first case, or in the latter case, to modify parameters or overrides specifying a particular font. Once the user makes a selection from a menu as provided in block 82, the software program processes the user request in a block 84, leading to activation of the controller in font development system 10 in a block 86.

Based upon the nature of the user request, the controller activated in block 86 may initiate one or more of a number of the actions that follow block 86 and flow chart 80. For example, in a block 90, if the user wants to edit either the Terafont or parametric data source files, a block 90 loads the appropriate source file, as indicated in a block 88, so that in a block 92, the user can edit the text in the selected source file using a generally conventional text editor. After editing is completed, in a block 94 the controller saves the source text to a modified source file, as noted in a block 96. A block 98 then updates the internal state of the system and as appropriate in a block 100, the state information is output to display 60 (FIG. 2), for example, indicating that the source files have been saved as requested by the user. Thereafter, the flow of logic returns back to block 82 to process the next user request.

An alternative action initiated by the controller in response to a user request might be compiling the Terafont source and/or parametric source data into an intermediate code in a block 102, and subsequently assembling the intermediate code in a block 104, to produce binary Terafont and/or parametric data files. The binary Terafont and parametric data may subsequently be used in response to another user request, by an executor in font engine 30, in a block 106. The executor activates font engine 30 to generate an output font (F'), following steps that are explained below. By starting the executor of font engine 30 in block 106, the user can visually see one or more characters of the output font in block 100, and based upon the displayed character, may elect to make changes to the parametric source data (or Terafont) to achieve, for example, a modification in the character outline of the output font.

After the Terafont source file has been compiled and assembled in blocks 102 and 104, in response to a user request, a block 108 writes the binary Terafont to a Terafont binary file, as indicated in a block 110. Similarly, the compiled and assembled parametric data can be written to a parametric data file, as indicated in a block 114, in response to a user request in a block 112.

In order to display a font in a native format appropriate for a particular system, such as TrueType or PostScript, a decision block 116 responds by activating a font formatter within the font engine in a block 118. Then, in a block 120, one or more characters of the output font that were reformatted, or the original outline characters if not reformatted, are written for storage in an output font file, as indicated in a block 122.

Finally, in response to a user request to exit the font development system program, the controller responds by exiting the program in a block 124. It will be appreciated that the options initiated by the controller after it is activated in block 86 are simplified in flow chart 80 to illustrate only the relatively high level functions of font development system 10. Those of ordinary skill in the art will appreciate that providing such options in a graphic environment such as Microsoft's Windows is relatively straightforward given the wealth of available information for programming such applications. Accordingly, details of the logic that are primarily related to administrative tasks associated with the graphics environment are not disclosed herein, because they are not necessary for an enabling disclosure of the present invention.

Figure 4:
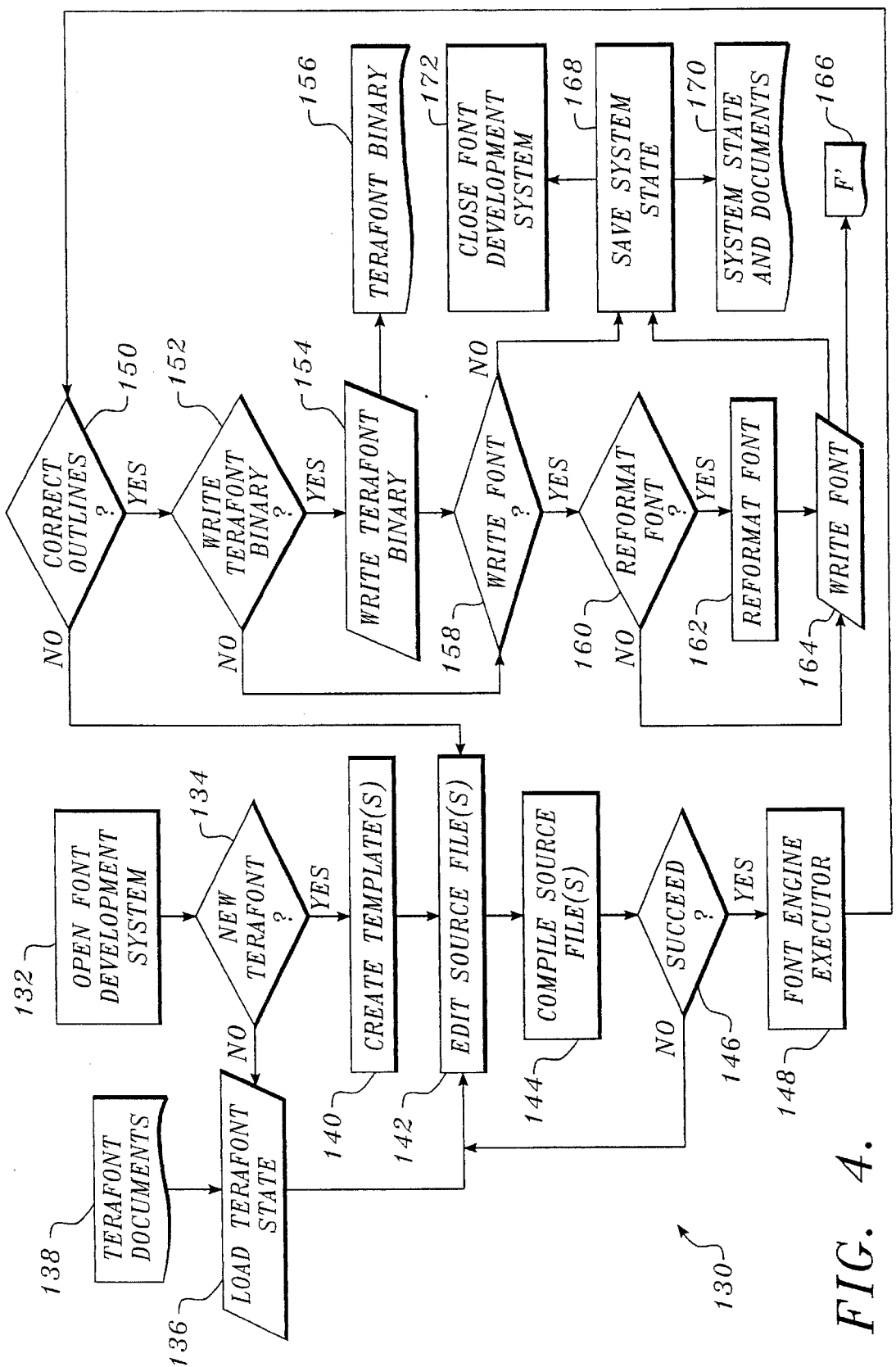
FIG. 4 is a flow chart illustrating the logical steps implemented on the font development system to produce a Terafont file that includes universal font generation rules.

Turning now to FIG. 4, details of a flow chart 130 are illustrated to disclose the steps followed in creating the Terafont binary data file 34 (shown in FIG. 1). Starting at a block 132, execution of the font development software on computer 50 opens the font development system. A decision block 134 determines if the user has elected to create a new Terafont. If the user is not interested in creating a new Terafont, as would most often be the case, a block 136 loads the Terafont by accessing the Terafont source file in a block 138. Alternatively, if the response to decision block 134 indicates that the user indeed wants to create a new Terafont, a block 140 creates new templates for the Terafont, which prompt the user to supply certain information necessary to define the Terafont for a given type of alphabet. For example, the characters in the alphabet, and other types of data generally specifying each character glyph of the alphabet as noted in the above description of the Terafont data must be provided by the user to complete the templates in block 140. By completing the templates, the user produces a Terafont source file that can universally be applied to generate any font of the alphabet.

A block 142 provides for editing the Terafont source files, which are either newly created, or have been loaded into memory in block 136. Once any changes have been made by the user in block 142, the Terafont source is compiled in a block 144. The step of compiling in block 144 is more generically referred to as translating, since it includes compiling and assembling the Terafont source files to produce a binary file in a format that can subsequently be executed by font engine 30.

A decision block 146 determines if the translation (or compilation and assembly in the preceding block) has been successful, and if not, returns to block 142. Otherwise, the flow chart proceeds to execute the executor of the font engine in a block 148. Details of the steps carried out by the executor of font engine 30 are described below.

A decision block 150 determines whether the correct outlines for one or more characters of an output font have been obtained, generally by providing a character on display 60 to be viewed by the user and responding to a user request to edit the Terafont. If not, the logic returns to block 142, to enable the user to edit the Terafont source files. However, if the user is satisfied that the Terafont source files are correct, the logic proceeds to a decision block 152. In this case, the user is given the option of writing the Terafont as compiled, to a binary file. If the user has elected to proceed in this matter, a block 154 writes the Terafont binary to a file, as indicated a block 156. Otherwise, the logic proceeds to a decision block 158.

In decision block 158, the program determines if the font should be written, e.g., in response to a request by the user. If the user elects not to write the font, the logic jumps to a block 168, wherein the system state is saved. Otherwise, the logic proceeds to a decision block 160, which determines whether it is necessary to reformat the font into a native format compatible with the operating system on the computer in which the font development system is running. If not, the logic proceeds to write the font in a block 164. Alternatively, the outline characters produced by the present invention are reformatted in a block 162. Block 164 writes the font to a font output file 166 and then proceeds to block 168, wherein the system state is saved. When saving the system state, all open Terafont and Parametric data source documents are saved in a block 170. Thereafter, the font development system closes in a block 172 (or alternatively, proceeds to process other user requests not related to the creation or editing of the Terafont).

Figure 5:
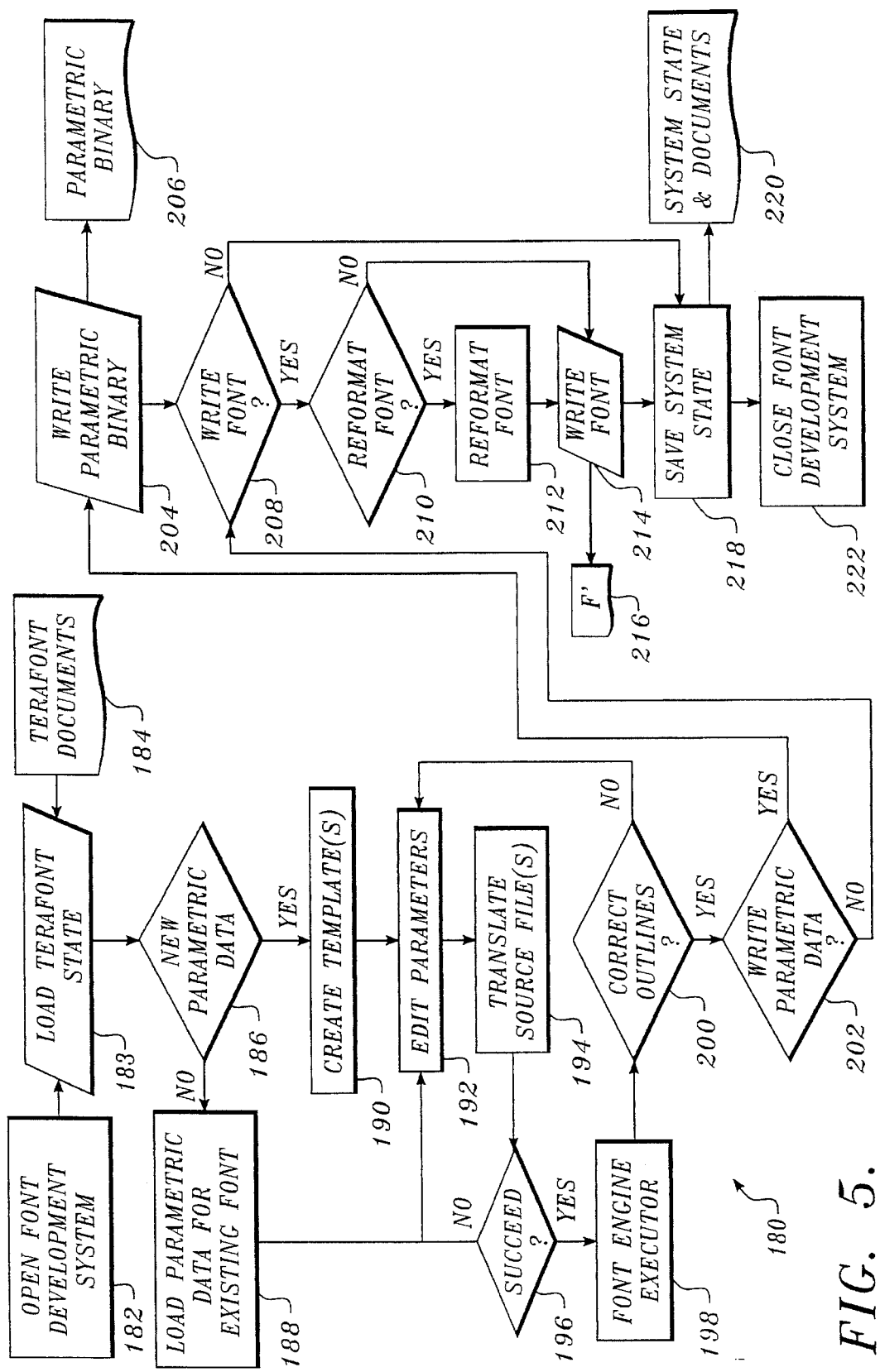
FIG. 5 is a flow chart illustrating the logical steps implemented on the font development system to produce parametric data required to specify a font.

A similar set of logical steps are implemented in creating and/or editing the parametric data for a particular font, as shown in a flow chart 180 in FIG. 5. In a block 182, the font development system opens and then proceeds to a block 183, wherein the Terafont binary data are loaded by accessing the Terafont binary file in a block 184. Thereafter, a decision block 186 determines if new parametric data is to be created, for example, to develop an entirely new font. If not, a block 188 provides for loading the parametric data for an existing font. Alternatively, the parametric data for an existing font might be developed by measuring a target font, or by providing a PANOSE™ number for the font to be produced. However, if new parametric data are being developed, a block 190 enables the user to complete a template for the parametric data. In completing the template, the user provides or specifies each of the parameters for the font, consistent with the above description of the parametric data.

After completing a template, or loading the parametric data for an existing font, block 192 allows the user to edit these parameters, for example, by providing or changing override default values for those otherwise determined by the Terafont. In this block, the user can also modify certain values for the parameters defining a specific font based upon one or more digits of the PANOSE™ number. Thereafter, block 194 translates the source file for the parametric data by compiling it and assembling it. A decision block 196 determines if the step of translating (i.e., compiling and assembling) the parametric source data has been successful. If not, the logic returns to block 192. Otherwise, it proceeds to start the executor of the font engine in a block 198. When the executor in font engine 30 is running, as provided in block 198, it applies the parametric data to the Terafont binary file that was loaded in block 183.

A decision block 200 then determines if the correct character outlines are presented on display 60, which in effect is a response to a decision by the user to further edit the font parameters to more precisely replicate an existing font, or to make additional refinements to a newly created font. If the character outlines require modification, the logic returns to block 192 to allow editing of the parameters. If not, the logic proceeds to a decision block 202, which determines if the parametric data should be written. If the user provides an affirmative answer, the logic proceeds to a block 204, which writes the binary parametric data to a file, as noted in a block 206. Should the user elect not to write the binary parametric data, the logic jumps around block 204 to a decision block 208, which determines if the font should be written to a file.

If the user decides to write the output font to a file, an affirmative response to decision block 208 leads to a decision block 210 to determine if it is necessary to reformat the font into a format compatible with the native font on the system. If so, a block 212 causes the font writer to reformat the font. Otherwise, the logic jumps around block 212, thereby maintaining the character outline format directly produced by the font development system. In either case, block 214 writes the output font to a file, as indicated in a block 216.

Thereafter, or if the font is not to be written, a block 218 saves the system state, which as indicated in block 220, includes storing Terafont and parametric data source files, and may also include object files, which contain translations. Subsequently, a block 222 closes the font development system.

Figure 6:
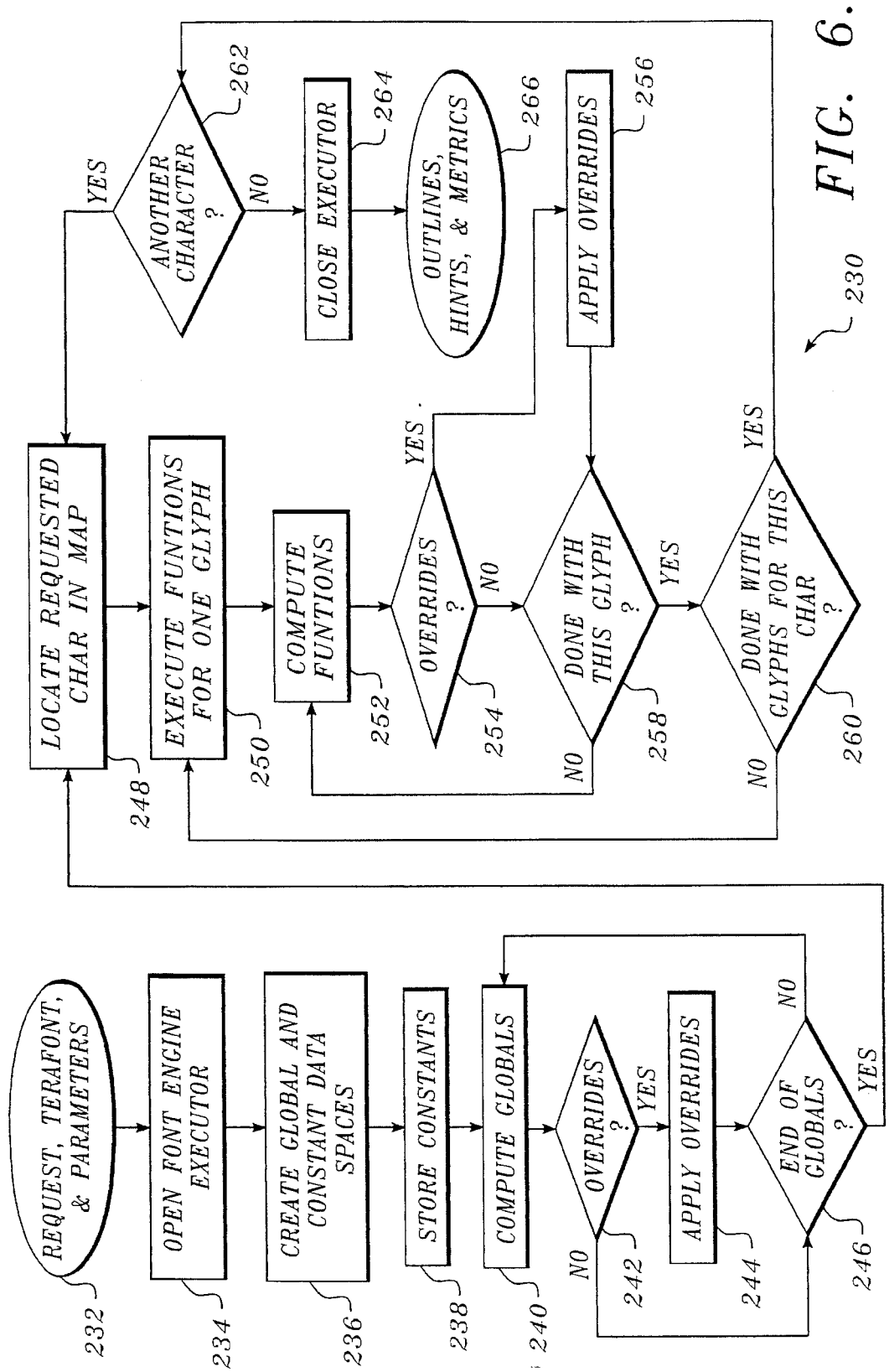
FIG. 6 is a flow chart that shows the logical steps followed by a font engine executor (on either the font development system or in a runtime font generation system) to generate characters of a font for display on an output device.

In FIG. 6, a flow chart 230 illustrates the logical steps that are implemented when the executor of font engine 30 is run on computer system 50. Initially, the Terafont binary data and parametric binary data are requested in a block 232, since these data are required for generating an output font. Following block 232, a block 234 opens the executor within font engine 30 to initiate the font generation process. A block 236 then creates global and constant data spaces in memory. Constants contained within the parametric data are stored in memory, in a block 238, followed by a block 240, wherein global values are computed as defined by the universal font generation rules within the Terafont.

A decision block 242 determines if any default values within the Terafont binary are to be overridden based upon the parametric data for the font. If there is an affirmative answer to this inquiry, a block 244 applies the override values. Thereafter, or if there are no override values to be applied, a decision block 246 determines if all of the global parameters have been determined. If not, the logic returns to block 240 to compute the next global. Otherwise, the logic continues to a block 248 to locate a requested character based upon the character map that is included in the Terafont data. The requested character can be one of a series of characters produced in generating all of the characters in the font. Alternatively, if only one character has been requested, only that character is located in the character map. A block 250 then executes the functions that are necessary to produce the outline for a glyph required to produce the character. Certain characters comprise only a single glyph, while some characters comprise a plurality of glyphs.

After the functions necessary to generate a glyph have been executed in block 250, a block 252 computes any additional functions necessary to define the outline path for the requested character. Thereafter, a decision block 254 determines if the results of the functions computed in block 252 are to be overridden and, if so, a block 256 applies the overrides.

Assuming that there are no overrides to be applied, or after the overrides have been applied, a decision block 258 determines if any further actions are required to generate the glyph currently being processed. If not, the logic proceeds to a decision block 260. Otherwise, the logic returns to decision block 254 to compute the next function necessary to produce the glyph.

In decision block 260, an inquiry determines if any further glyphs are required to produce the requested character. If all glyph have been completed, the logic proceeds to a decision block 260. Otherwise, the logic returns to block 250 to execute the functions for the next glyph required for the character.

In a decision block 262, the logic determines if another character is required to satisfy the request made when the font engine was initially executed. If not, a block 264 closes the executor of the font engine. Otherwise, the logic returns to block 248 to locate the next requested character in the character map of the Terafont. After the executor is closed in block 264, hints and metrics are bound to the outline in a block 266.

Figure 10:
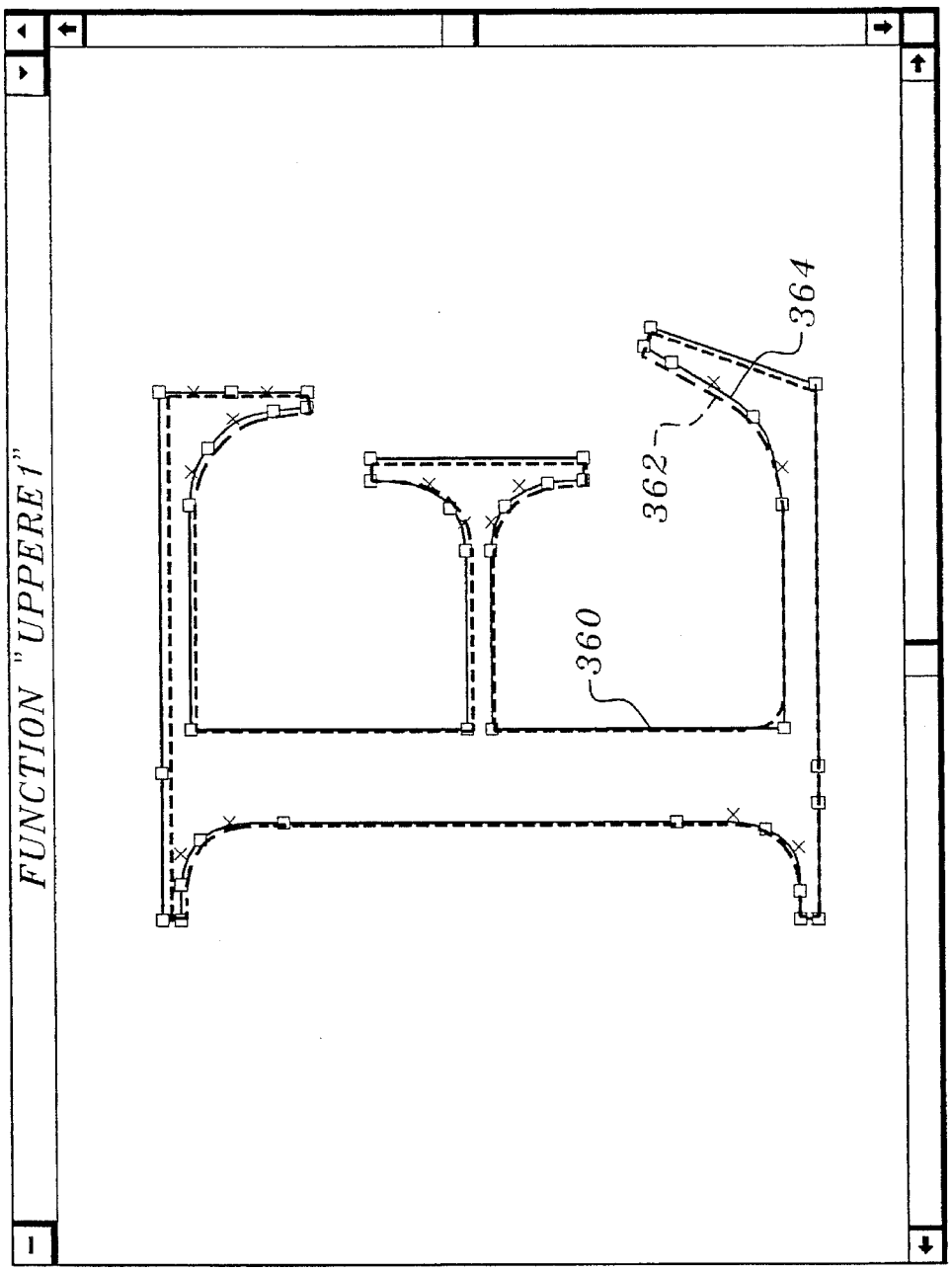
FIG. 10 is an exemplary screen from a preferred embodiment of the font development system, implemented in the graphical environment, illustrating a replication of an existing font to produce a new font.

FIG. 10 shows a representative example of the font measurement and replication tools provided by the graphical user interface in font development system 10. An upper case E character 360 from a typeface to be measured and subsequently replicated is displayed in the graphical view of this Figure as a dash outline 362, while the character outline generated by font engine 30 based upon the parametric data for the output font character is shown as a solid outline 364, with the computed positions of the on-curve points marked by circles, and the computed positions of off-curve points marked by crosses. By overlaying dash outline 362 with solid outline 364, the user can visually compare the two font characters to determine differences between them and can make changes to the parameters defining the output font character to more closely align it with the character of the existing target font. Point locations, as well as distances and angles between pairs of points, can be measured using the cursor tool in the graphical user interface. These measurements can in turn be used to define local override strings for the glyph function(s) used for the character to more accurately replicate the existing target font character outline. Alternatively, if a user is creating a new font, without reference to an existing font, override values may be applied to the default Terafont values to achieve a desired look to the outline of a character in the font being developed. The immediate feedback available for changes in the parametric data defining a font character enables efficient fine tuning of the parameters to achieve a desired visual appearance of each character in the output font being developed.

Figure 11:
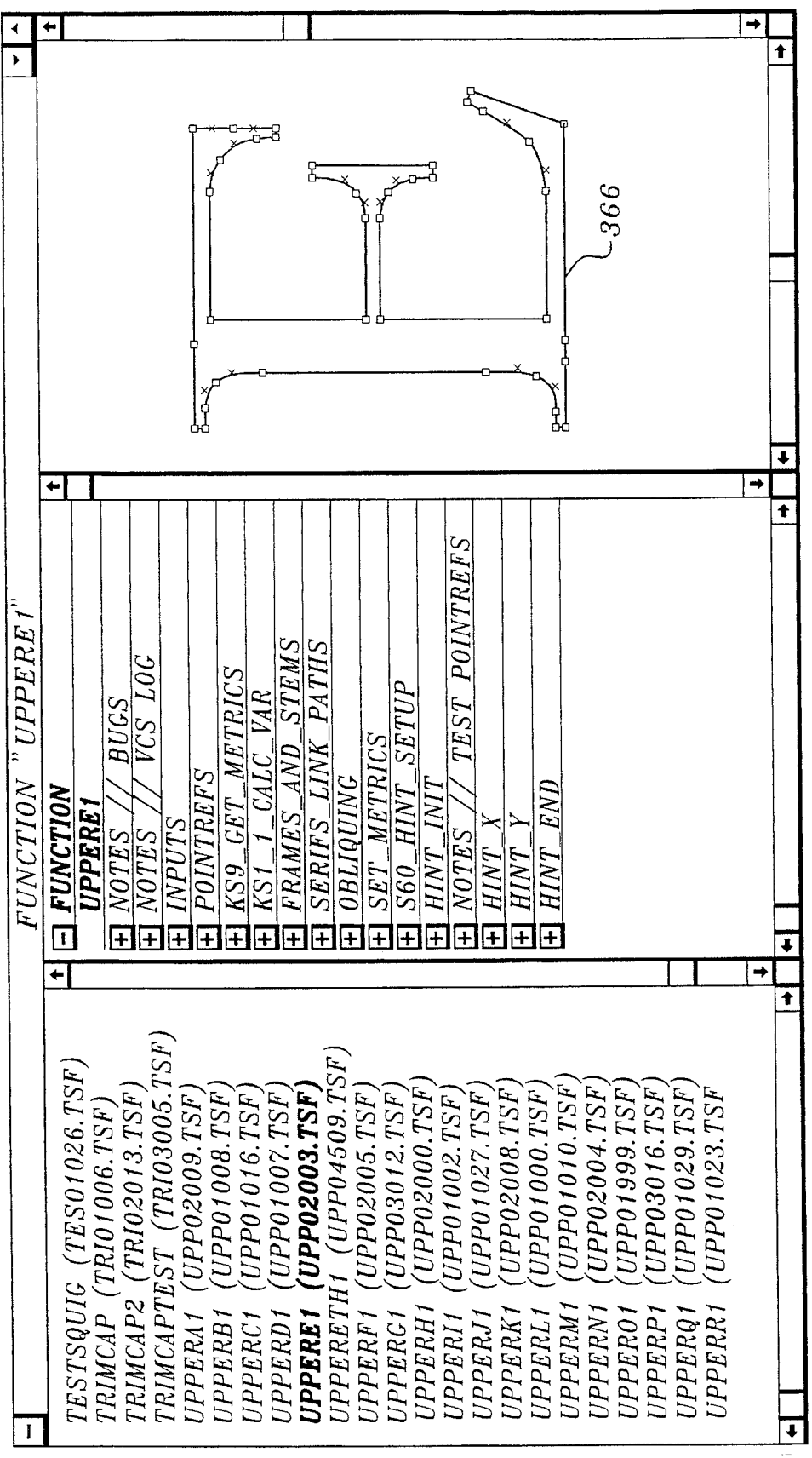
FIG. 11 is an example of a graphic environment screen showing a partial list of files comprising a Terafont source, and a text view and graphic view of a glyph function for an upper case E.

FIG. 11 shows the general layout of a representative screen of the graphical user interface employed for font development system 10, as well as a representative glyph function for the standard character outline topology of an uppercase E in the Times New Roman TrueType font. The menu driven format of this environment allows the operator to readily access features of the development system by using mouse 58 or keyboard 56, opening a plurality of windows in which different components of the font development system are available. For example, the left column window in this Figure shows a small portion of the available Terafont component names, which can be used to navigate among the Terafont globals and functions, and many of the uppercase character Terafont source files. These components can be interactively edited and compiled using the previously described components of the development system.

In the illustrated example in FIG. 11, the glyph function for the uppercase E has been selected. A glyph function is preferably displayed in three views, two of which are shown in FIG. 11 for this character, in the central text view window 30 and in the right graphic view window (as a character 366), respectively. The text view is divided into functional sections; any of these sections having a button that includes a+can be expanded into its full source text in another window, for editing or other purposes. The graphical view displays the character outline path resulting from the execution of the Terafont binary data by font engine 30 using the parametric data for a font character. The third view is a variable value view and is shown in FIG. 12. The variable value view of this character displays in text format, the values of all variables local to the glyph function UpperE1, following its execution.

The left column window in the screen display of FIG. 12 shows representative samples of override strings that appear in a parameter source file for the upper case characters C, D, and E in a Times New Roman Font. The screen display reproduced in this Figure is shown as it appears in the graphics environment in which font development system 10 is preferably run on computer 50. For the upper case character E, there are two override entries labeled "UpperE1\9" and "UpperE1\C1," and the latter includes two override parameters, "fTopSet" and "dMidSet." The fTopSet override is set in the middle column of FIG. 12, which is a window showing the variable value view of the UpperE1 glyph function. In this column, fTopSet is set equal to 0.98 (i.e., 98/100). Note that the conditional construct in the text view of the Terafont rules for this character assigns a value of either 9/10 or 1 to the fraction "fTopSet" depending on the value of a particular PANOSE number digit (i.e., the zero digit). The assigned value would be the default value used in producing the UpperE1 glyph function, except that it is overridden by the assigned value 0.98. The override value is applied after the Terafont logic has determined whether the 9/10 or 1 would be assigned to fTopSet, when the font engine encounters the override opcode "KSLAM(1)". The argument to this KSLAM opcode, "1", instructs the font engine to execute any overrides listed under the identifier "UpperE1\1:" in the parameter file, i.e., it references the override with the "1" in its identifier. In this instance, the variable fTopSet is reassigned the value 0.98. Similarly, when the font engine encounters the identifier "KSLAM(9)" it executes any override listed under the identifier "UpperE1\9."

The response of font development system 10 to a user request depends on the data provided in the parametric data file, and can occur at one of the following four levels:

1. The generic executor response to all input PANOSE™ number: If a PANOSE 2™ number is input, then global instructions are executed that extract measurement information from the PANOSE 2™ digits and then assign that information to a set $S_2$ of global variables. The values of these variables are generally not overridden, and the Terafont is designed to ensure that a subsequent measurement of the generated font F' will yield the input PANOSE 2™ number; in other words, self-consistency is enforced by design. If a PANOSE 1™ number is specified, then global instructions assign extracted measurement information to a set $S_1$ of global variables. By design of the PANOSE™ mapping system, $S_1$ is a subset of $S_2$; consequently, those global variables contained in the set $S_2-S_1$ (i.e., the difference between $S_2$ and $S_1$) must be assigned default values. These global variables may be overridden, but any overrides employed must not disable self-consistency.

2. the response of level 1 with the addition of metrics coercion: While the generated font F' will not necessarily represent an extremely high-fidelity rendition of a target font F (if such a target font exists), it will have essentially the same visual appearance and the same metrics.

3. The response of level 2 with global detail strings specifying topologies that are not extracted from the PANOSE™ number: These will be more common if a PANOSE 1™ number has been selected, rather than a PANOSE 2™ number, because the PANOSE 1™ classification system is not as rich or detailed as the PANOSE 2™ system.

4. The response of level 3, with additional global detail strings that 5 capture global typographic data not included in the PANOSE 2™ measurements.

5. The response of level 4, with local detail strings that capture typographic nuances present in individual glyphs.

Description of the Font Generation System

Figure 7:
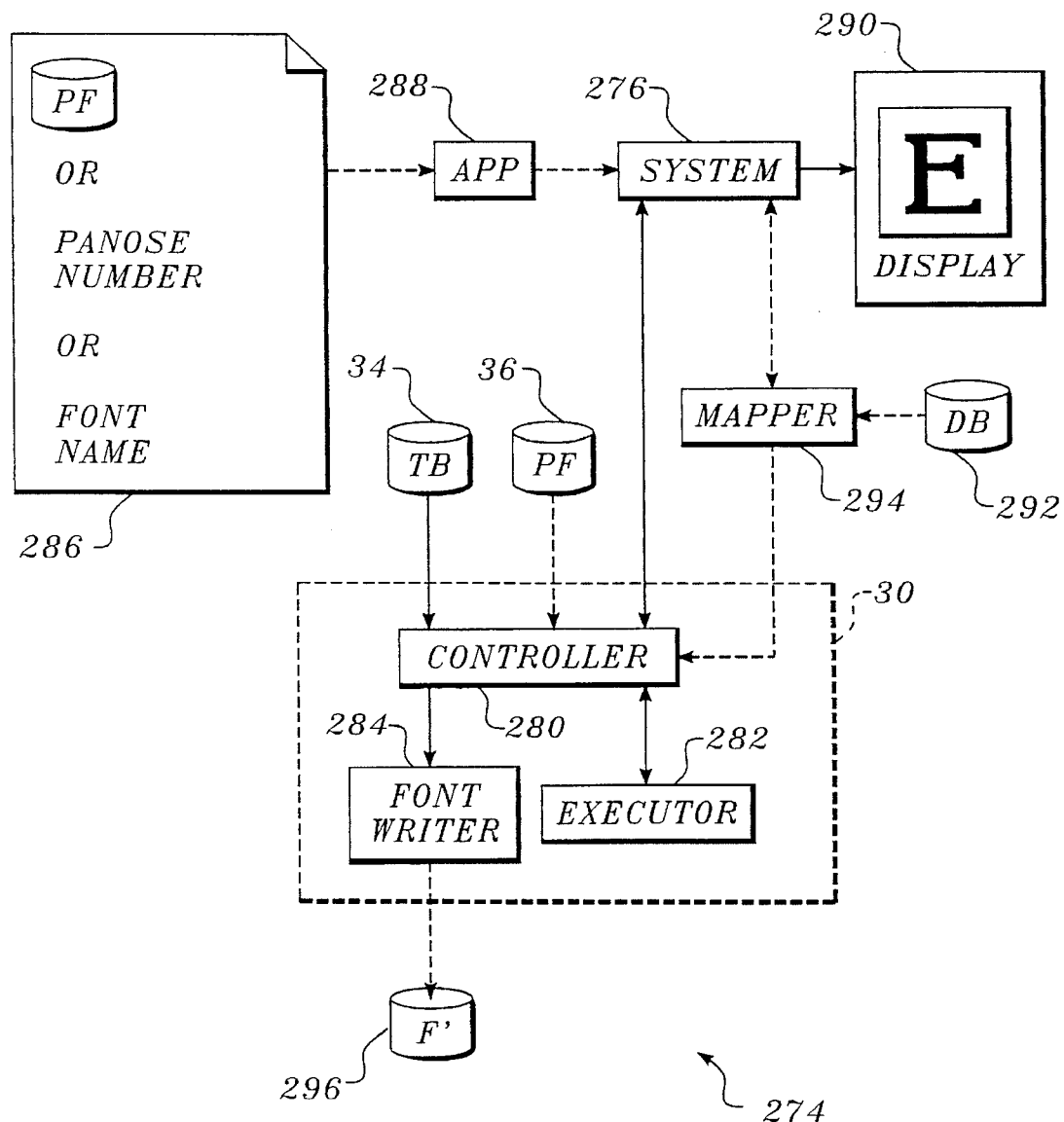
FIG. 7 is a functional block diagram of the runtime font generation system.

A font generation system 274 in accordance with the present invention is shown in FIG. 7, and typically will be executed on a personal computer, such as computer 50, shown in FIG. 2. It should be noted that the font generation system can either be run as a separate application, embedded in an operating system that loads into RAM 64 of computer 50 when it is booted-up, or can be a separate application (or part of another application) that is executed on the computer. In addition, the font generation system can be run on a separate integrated hardware module, similar to hardware module 72, which is coupled to computer 50, or can be disposed within printer 70, to be executed whenever a request to print characters of a font defined by parametric data files provided the printer is made. The nature of the font generation system enables it to be used in virtually any situation wherein it is necessary to produce one or more characters of a font defined by the parametric data created by font development system 10. Accordingly, the font that is to be generated for display on an output device 290 can be identified by data associated with a document 286 that is accessed by an application 288 after the application is loaded and executed under a system 276. The font that is to be used in displaying characters of the document on output device 290 is alternatively specified in one of three ways within the document (e.g., within a header, footer, or as embedded data), including within the document: (1) the parametric data that define the font in the INFINIFONT™ system; (2) a PANOSE™ typeface classification number for the font; or, (3) a font name, for example, TIMES NEW ROMAN. Application 288 passes the information within document 286 that specifies the font to be produced to system 276. Since the minimum requirement for parametric data needed to define a font is the PANOSE™ number for that font, if the document includes either the PANOSE™ number or more complete parametric data specifying the font, system 276 (or application 288) responds by executing font engine 30, which, as its reference number implies, is identical to the font engine included in font development system 10. Font engine 30 uses the PANOSE™ number or more complete parametric data provided to it when running Terafont binary data file 34, to generate an output font 296, F'. Alternatively, if the document only identifies the font by name, application 288 or system 276 can execute an optional mapper module 294 that references a database 292 in which the names of all fonts available to system 276 are included, along with the parametric data specifying those fonts. Mapper 294 then selects the closest match to the font name from among those fonts available on the system. If the name of the font in document 286 corresponds exactly to one of the fonts available on the system, then the parametric data for that font are provided to font engine 30 to be used with Terafont binary data file 34 in generating output font 296. Otherwise, mapper 294 provides font engine 30 the parametric data specifying the closest available font.

It will also be apparent that application 288 may provide parametric data specifying a font to font engine 30, independent of any document. For example, if application 288 comprises a drawing program, it may include parametric data specifying several fonts that are included with the drawing program, allowing the user to select the font from among those included from a menu. Similarly, system 276 may include parametric data specifying one or more fonts. For example, it is contemplated that system 276 may be a graphics environment that provides a plurality of fonts for use in the environment and specifies any of these fonts selected by a user by providing the parametric data provided with the system for the fonts, to font engine 30. Alternatively, system 276 may simply access parametric data file(s) 36, which are stored in ROM 62, or on hard drive 68, or on other media, to enable font engine 30 to generate the selected font. Given the relatively small size of the parametric data required for each font and the expected low cost of developing each font specified by such parametric data, it is contemplated that a typical user may have access to literally hundreds of different high quality fonts at relatively low cost. In a likely paradigm for use of the INFINIFONT™ system, the operating system would include the Terafont binary file and with font engine 30, and perhaps would provide at least some fonts specified by parametric data.

Font engine 30 includes a controller 280 that is responsive to requests for generating a font (or even a single font character) and carries out system functions such as loading Terafont binary file 34 and the parametric data. Controller 280 also exercises control over the other elements of the font engine. These elements include a font writer 284, and an executor 282. Executor 282 is the functional portion of the font engine that actually executes the Terafont binary file using the parametric data to generate one or more font characters upon demand of the system, and under the control of controller 280. Font writer 284 handles any necessary reformatting of the outline font characters of the INFINIFONT™ system into a font format native to system 276, such as TrueType or PostScript. The output font characters are then stored in output font 296 and/or provided to system 276 for display on output device 290.

The font engine is preferably implemented as a software virtual machine that executes programs stored in the Terafont binary using the parametric data that specify a font. The virtual machine resembles other stack-based systems, except that there are special instructions in the Terafont binary file, as explained above, for manipulating font constructs, including Bezier curves and hints. When used to generate fonts in accordance with the present invention, the font engine maintains a glyph database in memory (not separately shown) that contains a runtime record of data bound to each glyph outline that has been constructed, including point references, hints, metrics, and alignment points to be used when building composite characters. When an entire font is to be generated by the font engine (as compared to a single character), after execution of global functions and all functions required to build the glyphs listed in the character map included in Terafont binary data file 34, font engine 30 binds all resulting outline, hint, and metric data together and then calls font writer 284 to build output font 296 under a supported format. Where only a single character is to be generated as quickly as possible, font engine 30 executes only the Terafont globals and those glyph functions and called subfunctions necessary to construct that character. The executed global code can be cached in RAM 64 (FIG. 2) for later use, so that subsequent characters can be generated even more rapidly.

Font engine opcodes are divided into the following broad categories:

1. Path Creators

Opcodes that create character outline paths and graphical elements that can be used to build the paths, such as points and curves. In the preferred embodiment, the path elements comprise second-order or third-order Bezier curves, defined by an ordered set of on-curve and off-curve points.

2. Path Transformers

Opcodes that convert existing character outline paths into new paths using standard coordinate mapping transformations, including scaling, rotating, reflecting, and obliquing.

3. Path Intersectors

Opcodes that find one or more specified intersections of two character outline paths and then return one or more resultant paths. Intersection operations include trimming of unwanted path segments after the intersection is found, applying a rounded corner to the vertex of an intersection, updating references to points of interest for hinting, linking two or more paths into a single path, and closing a sequence of paths to form a single path representing a character outline.

4. Mathematics

Opcodes that perform basic arithmetic, including stack management, and compute special functions, such as transcendentals.

5. State Handlers

Opcodes that can access and modify the current font engine system state. This set includes opcodes, which: access and modify the stored metric values for the current glyph function (described below); update the hint state bound to a particular glyph so that a specific hint fragment is executed when the glyph is passed to the rasterizer of display 60 (FIG. 2); update data needed to build composite characters, such as alignment points; and, override the current state of a global or character related data space.

It is contemplated that font engine 30 might allow the user to modify one or more parameters of a font being generated. For example, it might allow the user to elect not to bind kerning or hinting functions to the characters, to increase the speed with which a draft print job is completed.

The ability of the font engine to override the values of variables stored in the global and character related data spaces is a unique feature of the present invention, allowing parametric data size and character generation rate to be functions of the desired target font replication fidelity. Preferably, a detail string included in the parametric data for a font instructs font engine 30 to override the value of a particular global or local variable at a particular point during the execution of the Terafont binary file. When the font engine enters a particular function stored in the Terafont binary file, it allocates a data space sufficiently large to hold the character related variables used during the execution of the function. If the font engine encounters an override opcode in the Terafont binary file instruction stream, it accesses the override instructions indicated by the argument to the opcode (as noted above) and performs the requested operation. For example, an override string may ask that a particular value stored at a specified location in the character related data space be incremented or decremented by a certain amount, scaled by a certain factor, or simply replaced with another value.

Figure 8:
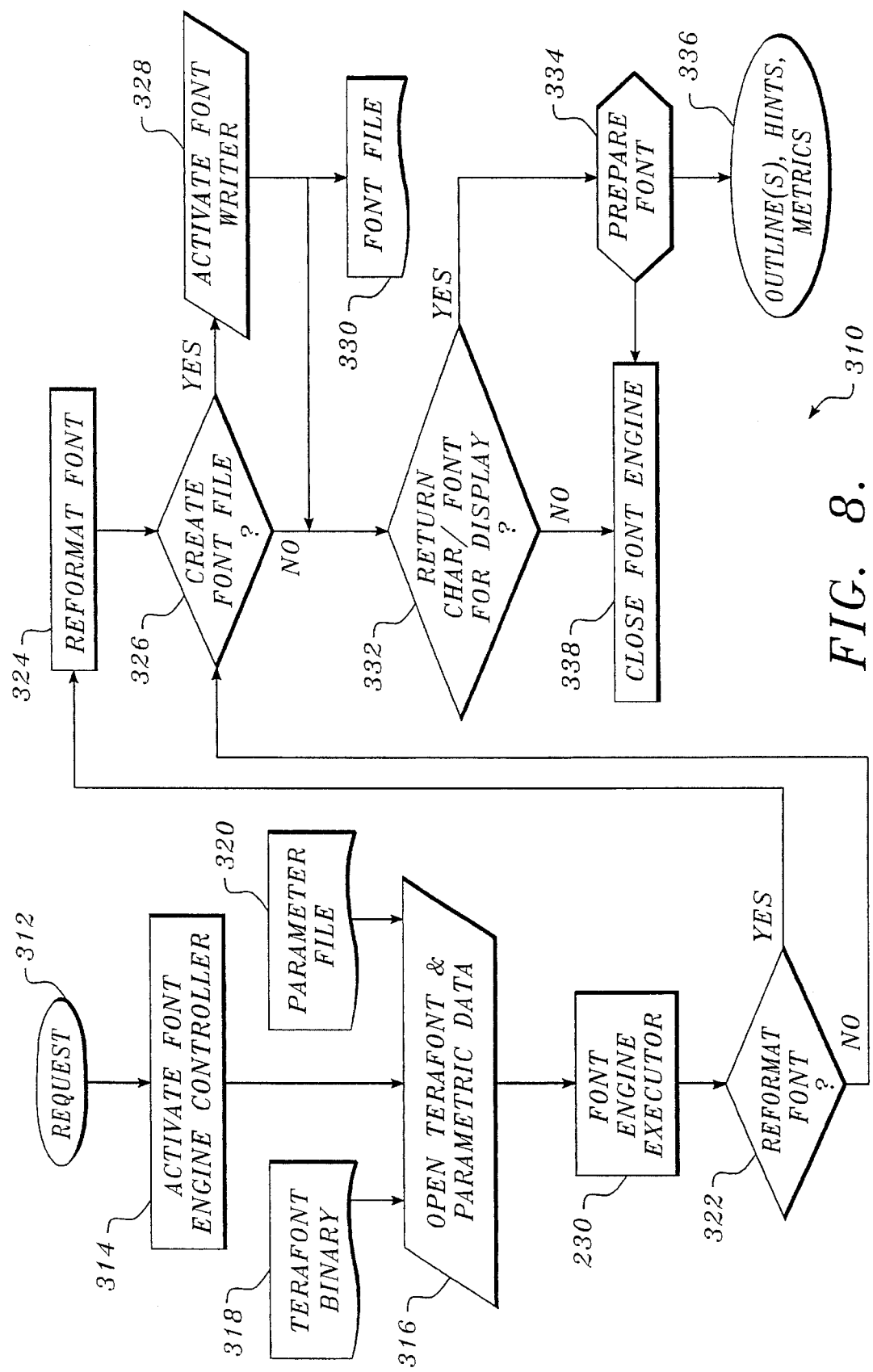
FIG. 8 is a flow chart illustrating the logical steps implemented by the runtime font generation system.

A flow chart 310 is shown in FIG. 8 to illustrate the logical steps implemented by the font generation system. Flow chart 310 begins at a block 312 wherein a request is received from system 276, which leads to a block 314 that activates controller 280 in font engine 30. A block 316 then opens the Terafont and parametric data files as indicated by blocks 318 and 320, respectively. The next logical step in the process initiates executor 282 in the font engine, as indicated in a block 230. The steps carried out by executor 282 have been described above, in connection with flow chart 230 in FIG. 6. After the glyphs in a requested character or characters have been produced by the executor as explained above, a decision block 322 determines whether it is necessary to reformat the font and, if so, a block 324 converts the font to the native format for system 276. Otherwise, block 324 is skipped by the logic, leading to a decision block 326. In this decision block, controller 280 determines whether it is necessary to create a font file, based upon either input from the user or a request made by an application or by the system. An affirmative response to this decision block leads to a block 328, which activates font writer 284. Font writer 284 writes the characters that have been generated to a font file as indicated in a block 330.

Subsequently, a block 332 determines if it is appropriate to return a character or the entire font to system 276, to be conveyed to output device 290, which may comprise display 60 or printer 70. If the character or font is to be displayed, a block 334 prepares the font by providing the character outline or the outlines for multiple characters comprising the font, the hints, and the metrics bound thereto to system 276, as noted in a block 336. Thereafter, the font engine is closed in a block 338. In the event that it was not necessary to display the font, decision block 332 leads to a block 338, bypassing the steps for preparing the font and passing it on to the system.

While the preferred embodiment of the invention has been illustrated and described, it will be appreciated that various changes can be made therein without departing from the spirit and scope of this invention. For example, the logical structure of the Terafont globals or Terafont functions can be changed significantly, depending upon the richness of the Terafont source language, without significantly affecting the font engine override mechanism. High-level language constructs, data types, and syntax can be altered without affecting the logical structure of the Terafont. The "look and feel" of the graphical user interface can be altered without affecting the architecture of either the font development system or the font generation system. Any other numerical typeface classification standard—or none at all—can be used in place of the PANOSE™ system. On powerful, distributed, or massively parallel computer systems, the functions in the Terafont may be executed in parallel rather than sequentially. Another character mapping standard can be used in place of the Unicode standard.

The scope of the present invention is not intended to be limited by the disclosure, the foregoing modifications, or any other modifications that may be apparent to those of ordinary skill in the art. Instead, the scope of the invention should be determined entirely by reference to the claims that follow.

The embodiments of the invention in which an exclusive property or privilege is claimed are defined as follows:

1. A method for creating and/or specifying any of a plurality of different fonts on a computer that can be generated on another computer, comprising the steps of:

(a) defining universal font generation rules that include:

(i) instructions for computing variables used universally to specify each of the plurality of fonts generated by the method;

(ii) instructions to build glyphs, parts of glyphs, and composite glyphs that comprise portions of characters included in the fonts;

(iii) a character map that identifies the characters included in the fonts; and (iv) constants that are used to specify the plurality of fonts;

(b) specifying a specific font by defining font parameters that are operator readable and indicate characteristics of individual characters comprising the specific font and thereby fully characterize outlines of the characters, when combined with the universal font generation rules;

(c) translating the universal font generation rules into a universal font generation file that is stored on a medium that is distributable to other computers;

(d) translating the font parameters into parametric data for the font that is specified, said parametric data being machine readable, substantially smaller in size compared to the universal font generation file, and distributable to an end user; and (e) providing a font generation program that is distributable to an end user, and which applies the parametric data to the universal font generation file to generate the characters comprising the specific font specified by said parametric data.

2. The method of claim 1, further comprising the step of measuring characters of an existing font to determine the font parameters used to produce the parametric data, so that a font including characters substantially identical to the characters of said existing font is generated by the font generation program.

3. The method of claim 2, further comprising the steps of comparing a character of said existing font with a character generated by the font generation program; and modifying the font parameters used to produce the parametric data so that the character generated more closely matches the character of the existing font.

4. The method of claim 3, wherein the step of comparing comprises the step of overlaying the character generated with the character of the existing font on a computer display screen to visually determine differences between the two characters; and wherein the step of modifying comprises the step of changing at least one parameter defining the character generated to more closely align with the character of the existing font.

5. The method of claim 1, wherein the step of defining universal font generation rules includes the step of defining hinting fragments that are bound to selected glyphs and/or parts of glyphs to achieve hinting of a font, use of the hinting fragments being determined by the font parameters.

6. The method of claim 1, wherein the step of specifying a specific font by defining font parameters includes the step of defining metric and kerning data for the specific font.

7. The method of claim 1, wherein a set of default values is initially assigned to the font parameters, any default value for a font parameter being overridable to define the font parameters for the specific font.

8. The method of claim 1, wherein the font parameters defining the specific font at least in part are based on a PANOSE typeface classification number for said font.

9. The method of claim 1, wherein the font parameters are defined in a graphics environment, enabling a selected character of a font being specified to be graphically displayed in detail, so that the effect on said selected character of varying values of the font parameters is readily observed.

10. The method of claim 1, wherein the font parameters indicate characteristics of individual characters of a new font.

11. The method of claim 10, wherein the step of specifying the font by defining the font parameters includes the step of changing the font parameters that specify an existing font, to specify a new font by modifying the font parameters for the existing font.

12. A method for generating characters of a selected font on a computer, for display on an output device, comprising the steps of:
  (a) accessing a universal font generation file, for input to the computer, said universal font generation file including universal font generation rules for generating a plurality of different fonts that comprise:
    (i) instructions for computing variables universally used to specify the plurality of fonts;
    (ii) instructions to build glyphs, parts of glyphs, and composite glyphs that comprise portions of characters included in the plurality of fonts;
    (iii) a character map that identifies the characters included in the plurality of fonts; and
    (iv) constants that are universally used to specify the plurality of fonts;
  (b) accessing font parametric data, which are machine readable and are derived from font parameters that specify characteristics of individual characters comprising the selected font, said font parametric data thereby fully characterizing outlines of the characters when combined with the universal font generation rules;
  (c) executing a font generation program, said font generation program applying the font parametric data to the universal font generation rules to generate at least one outline font character of the selected font; and
  (d) formatting said at least one outline font character in a font format appropriate for display on the output device.

13. The method of claim 12, wherein the font generation program is executed while an application is running on the computer, and wherein said at least one outline font character is determined by said application.

14. The method of claim 12, wherein an operating system used by the computer executes the font generation program and provides the parametric font data to the font generation program to generate a font.

15. The method of claim 12, wherein an application running on the computer executes the font generation program and provides the parametric font data to the font generation program to generate a font.

16. The method of claim 12, wherein the font generation program is executed in an integral hardware module coupled to the computer.

17. The method of claim 12, wherein the font generation program is executed on the computer in a graphics environment, said graphics environment controlling selection of the selected font, further comprising the step of providing different font parametric data for access by the computer for each font selected to be displayed and/or printed, said graphics environment including an option enabling a user to select a specific font from among the plurality of fonts and thereby accessing the font parametric data for the specific font that is selected, the same font generation program and universal font generation file being used for displaying and/or printing each such selected font.

18. The method of claim 12, wherein the font generation program is executed as a background task to display characters of the selected font on the display screen in response to corresponding characters being selected by a user on a computer input device.

19. The method of claim 12, wherein at least one of the universal font generation file, the font generation program, and font parametric data is stored in read only memory.

20. The method of claim 12, wherein the font parametric data are associated with a document file and are transferred with the document file to convey the document file to another computer.

21. The method of claim 12, wherein the font parametric data for the selected font are less than two kBytes in size.

22. The method of claim 12, further comprising the step of translating said font format into a different font format.

23. The method of claim 22, wherein the step of translating said font format includes the step of binding hints to characters in the different font format appropriate for display on the output device.

24. The method of claim 12, wherein the step of executing includes the step of generating hints to be bound to characters of the selected font.

25. The method of claim 12, wherein the step of formatting includes the step of binding kerning and metrics to characters in said font format.

26. The method of claim 12, further comprising the step of selectively overriding at least one parameter of the font parametric data when the font generation program executes.

27. The method of claim 12, wherein the font parametric data for the selected font at least in part include a PANOSE typeface classification number for said selected font.

28. A system for creating and/or specifying any of a plurality of different fonts, comprising:
  (a) a computer, including a processor, a volatile memory, a non-volatile memory, an output device on which characters of a font can be displayed, and an input device;

(b) means embodied in software that is stored in the non-volatile memory and executes on the processor, for defining universal font generation rules that include:
  (i) instruction for computing variables universally used to specify the plurality of fonts;
  (ii) instructions to build glyphs, parts of glyphs, and composite glyphs that comprise portions of characters included in the plurality of fonts;
  (iii) a character map that identifies the characters included in the plurality of fonts; and
  (iv) constants that are universally used to specify the plurality of fonts;
(c) means embodied in software stored in the non-volatile memory, for specifying a font by establishing font parameters that are operator readable and which specify characteristics of individual characters comprising a specific font and thereby fully characterize the outlines of the characters when applied to the universal font generation rules;
(d) means for translating the universal font generation rules to produce a universal font generation file that is stored in the non-volatile memory and which is distributable for use on other computers;
(d) means for translating the font parameters to produce parametric data for each font that is created, said parametric data being machine readable and substantially smaller in size compared to the universal font generation file, and being stored in non-volatile memory and distributable for use on other computers; and
(e) font generation means, for applying the parametric data to the universal font generation file to generate at least one of the characters comprising the specific font specified by said parametric data.

29. The system of claim 28, further comprising means, embodied in software, for measuring characters of an existing font to determine the font parameters used to produce the parametric data, so that a font including characters substantially identical to the characters of said existing font is generated by the font generation means.

30. The system of claim 29, further comprising means for comparing a character of said existing font with a character generated by the font generations means, and means for modifying the font parameters used to produce the parametric data so that the character generated more closely matches the character of the existing font.

31. The system of claim 30, wherein the means for comparing comprises the output device and means embodied in software, for displaying the character of the existing font and the character generated by the font generation means, and wherein the means for modifying include means for changing at least one parameter defining the character generated using the input device, so that the character generated more closely matches the character of the existing font.

32. The system of claim 28, wherein the means for defining universal font generation rules also defines hinting fragments that are bound to selected glyphs and/or parts of glyphs to achieve hinting of a font, use of the hinting fragments being determined by the font parameters.

33. The system of claim 28, wherein the means for specifying the font by defining the font parameters also defines metric and kerning data for the font.

34. The system of claim 28, wherein the means for specifying the font by defining the font parameters initially assigns default values to the font parameters, but includes means for overriding any default value assigned to a font parameter to define the font parameters for a specific font.

35. The system of claim 34, wherein the default values assigned to the font parameters are at least in part based on a PANOSE typeface classification number of the selected font.

36. The system of claim 28, wherein the output device displays in detail a selected character of a font being specified, and wherein the means for specifying the font by defining the font parameters include means for varying values of selected font parameters on the input device so that the effect of such variation is observed on the selected character being displayed.

37. The system of claim 28, wherein the means for specifying the font by defining the font parameters are used to specify font parameters of a new font.

38. The system of claim 37, wherein the means for specifying the font by defining the font parameters include means for loading parameters of an existing font from non-volatile memory, said means for specifying including means for changing the font parameters to define the new font using the input device.

39. The system of claim 28, wherein said font generation means comprises an integral hardware module that is coupled to the computer.

40. A system for generating characters of a selected font comprising:
  (a) a computer, including a processor, a volatile memory, a non-volatile memory, an output device, and an input device;
  (b) a universal font generation file including universal font generation rules for generating a plurality of different fonts that comprise:
    (i) instructions for computing variables universally used to specify the plurality of fonts;
    instructions to build glyphs, parts of glyphs, and composite glyphs that comprise portions of characters included in the plurality of fonts;
    (iii) a character map that identifies the characters included in the plurality of fonts; and
    (iv) constants that are universally used to specify the plurality of fonts;
  (c) font parametric data, which are machine readable and are derived from font parameters that are operator readable and used to specify characteristics of individual characters comprising the selected font, said font parametric data thereby fully characterizing the outlines of the characters of the selected font when combined with the universal font generation rules;
  (d) font generation means for applying the font parametric data to the universal font generation rules to generate at least one outline font character of the selected font;
  (e) means for formatting said at least one outline font character into a desired font format; and
  (f) said output device displaying said at least one outline font character in the desired font format.

41. The system of claim 40, further comprising application means, embodied in software, for providing the font parametric data so that at least one outline font character is determined by said application means.

42. The system of claim 40, further comprising operating system means, embodied in software, for executing said font generation means and for providing the font parametric data so that at least one outline font character is determined by said operating system means.

43. The system of claim 40, further comprising graphic environment means, embodied in software, for determining the selected font and executing said font generation means, and for providing the font parametric data corresponding to the selected font.

44. The system of claim 40, wherein the font generation means comprise a hardware module that is coupled to the computer.

45. The system of claim 40, wherein said font generation means display characters of the selected font on the output device in response to corresponding characters being selected by a user on the input device.

46. The system of claim 40, wherein the non-volatile memory includes read only memory and at least one of the universal font generation file, the font generation means, and the font parametric data is stored in the read only memory.

47. The system of claim 40, wherein the font generation means includes means for extracting the font parametric data from a document file and for transferring the font parametric data to a document file.

48. The system of claim 40, wherein the font parametric data for the selected font are less than two kBytes in size.

49. The system of claim 40, further comprising means for translating said font format into a different font format.

50. The system of claim 49, wherein the means for translating said font format include means for binding hints to characters in the different font format, appropriate for display on the output device.

51. The system of claim 40, wherein the font generation means include means for generating hints to be bound to characters of the selected font.

52. The system of claim 40, wherein the means for formatting include means for binding kerning and metrics to characters in said font format.

53. The system of claim 40, wherein the font generation means includes means for overriding at least one parameter of the font parametric data when the font generation means executes on the computer.

54. The system of claim 40, wherein the font parametric data for the selected font at least in part include a PANOSE typeface classification number for said font.

* * * * *